United States Patent
Lee et al.

(10) Patent No.: US 9,693,179 B2
(45) Date of Patent: Jun. 27, 2017

(54) METHOD AND APPARATUS FOR PRODUCING PERSONAL AREA NETWORK IDENTIFIER (PANID) ON NETWORK IN WIRELESS COMMUNICATION SYSTEM

(71) Applicant: LG ELECTRONICS INC., Seoul (KR)

(72) Inventors: Jaeho Lee, Seoul (KR); Jangwoong Park, Seoul (KR); Hyeonjae Lee, Seoul (KR); Minsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/031,987

(22) PCT Filed: Oct. 16, 2014

(86) PCT No.: PCT/KR2014/009757
§ 371 (c)(1),
(2) Date: Apr. 25, 2016

(87) PCT Pub. No.: WO2015/060583
PCT Pub. Date: Apr. 30, 2015

(65) Prior Publication Data
US 2016/0277874 A1    Sep. 22, 2016

Related U.S. Application Data

(60) Provisional application No. 61/894,870, filed on Oct. 23, 2014.

(51) Int. Cl.
*H04W 4/00* (2009.01)
*H04L 29/12* (2006.01)

(52) U.S. Cl.
CPC ......... *H04W 4/008* (2013.01); *H04L 61/2038* (2013.01); *H04L 61/2046* (2013.01); *H04L 61/2092* (2013.01)

(58) Field of Classification Search
CPC ...................................... H04W 4/008
See application file for complete search history.

(56) References Cited

U.S. PATENT DOCUMENTS

2007/0140194 A1   6/2007  Lee et al.
2012/0124367 A1*  5/2012  Ota ..................... H04W 12/04
                                                   713/153

(Continued)

FOREIGN PATENT DOCUMENTS

KR         10-0649680 B1    11/2006
KR     10-2007-0064227 A    6/2007

(Continued)

*Primary Examiner* — Tuan H Nguyen
(74) *Attorney, Agent, or Firm* — Birch, Stewart, Kolasch & Birch, LLP

(57) ABSTRACT

A method for creating a personal area network identifier (PAN ID) of a network in a wireless communication system includes creating a first PAN ID; receiving a message including a second PAN ID from a source coordinator; comparing the first PAN ID with the second PAN ID included in the received message; and when the first PAN ID and the second PAN ID are the same according to the comparison result, transmitting an indication message related to a PAN ID conflict to the source coordinator, wherein at least any one of the first PAN ID and the second PAN ID may be created through a hash algorithm and the indication message may include at least any one of a conflicted PAN ID or an error code indicating a conflict.

12 Claims, 22 Drawing Sheets

(56) References Cited

U.S. PATENT DOCUMENTS

2012/0254958 A1* 10/2012 Budampati ......... H04L 61/2038
  726/6
2012/0308012 A1   12/2012 Yoon
2013/0107851 A1    5/2013 Park et al.
2014/0006586 A1    1/2014 Hong et al.

FOREIGN PATENT DOCUMENTS

KR   10-2012-0133147 A    12/2012
WO   WO 2012/008741 A2     1/2012
WO   WO 2012/074185 A1     6/2012

* cited by examiner (a)

(b)

(c)

⊞ PAN coordinator (FFD)
◐ Router (FFD)
○ End Device (RFD)

METHOD AND APPARATUS FOR PRODUCING PERSONAL AREA NETWORK IDENTIFIER (PANID) ON NETWORK IN WIRELESS COMMUNICATION SYSTEM

CROSS REFERENCE TO RELATED APPLICATIONS

This application is the National Phase of PCT International Application No. PCT/KR2014/009757, filed on Oct. 16, 2014, which claims priority under 35 U.S.C. 119(e) to U.S. Provisional Application No. 61/894,870, filed on Oct. 23, 2013, which is hereby expressly incorporated by reference into the present application.

TECHNICAL FIELD

The present invention relates to a method and apparatus for creating a personal area network identifier (PANID) of a network in a wireless communication system. More particularly, the present invention relates to a method and apparatus for creating a PANID of a network and for changing a PANID when PANIDs created between networks are the same so the PANIDs conflict with each other.

BACKGROUND ART

ZigBee, a technology implementing short-range wireless communication in houses or offices, features low power, a very small size, and low cost and also features that data may be transmitted at a rate of 250 kbps within a distance ranging from 10 to 20 meters on the basis of IEEE 802.15.4 and 65,000 or more nodes may be connected. The ZigBee technology has been extensively applied to various ubiquitous computing environments such as intelligent home network, building and industrial device automation, distribution, environment monitoring, human interface, healthcare, telematics, military sector.

ZigBee network is established by two-way communication based on standard protocols between a coordinator as a higher end and a device as a lower end.

Also, in the ZigBee network, a unique PANID is defined for a coordinator of each personal area network (PAN). However, the current ZigBee standard technology does not specify a scheme of creating a PANID.

DISCLOSURE

Technical Problem

Therefore, an object of the present invention is to provide a method and apparatus for creating a PANID of a network in a wireless communication system.

Another object of the present invention is to provide a method and apparatus for creating a unique PANID of a network using a MAC address in a wireless communication system.

Another object of the present invention is to provide a method and apparatus for resolving a conflict that occurs between PANIDs of a network in a wireless communication system.

Another object of the present invention is to provide a method and apparatus for resolving a conflict that occurs between PANIDs even though a PANID of a network is changed in a wireless communication system.

The technical subjects of the present invention are not limited to the aforesaid, and any other technical subjects not described herein will be clearly understood by those skilled in the art from the embodiments to be described hereinafter.

Technical Solution

According to an aspect of the present invention, there is provided a method for avoiding a personal area network identifier (PAN ID), including: creating a first PAN ID; receiving a message including a second PAN ID from a source coordinator; comparing the first PAN ID with the second PAN ID included in the received message; and when the first PAN ID and the second PAN ID are the same according to the comparison result, transmitting an indication message related to a PAN ID conflict to the source coordinator, wherein at least any one of the first PAN ID and the second PAN ID may be created through a hash algorithm and the indication message may include at least any one of a conflicted PAN ID or an error code indicating a conflict.

Also, in the present invention, the hash algorithm may be performed through an IEEE address and a 16-bit hash table.

Also, in the present invention, the method may further include: negotiating related to a change in a PAN ID with the source coordinator; and determining a coordinator for changing a PAN ID according to a negotiation result.

Also, in the present invention, the coordinator for changing a PAN ID may be determined on the basis of at least any one of the number of nodes of a personal area network (PAN) and remaining battery capacity.

Also, in the present invention, the message may be transmitted in an ad-hoc manner.

Also, in the present invention, the message may be periodically transmitted from the source coordinator.

According to another aspect of the present invention, there is provided a method for avoiding a personal area network identifier (PAN ID), including: receiving a first message including a first PAN ID from a first source coordinator; receiving a second message including a second PAN ID from a second source coordinator; comparing the first PAN ID and the second PAN ID; and when the first PAN ID and the second PAN ID are the same according to the comparison result, transmitting an indication message related to a PAN ID conflict to the first source coordinator and the second source coordinator, wherein at least any one of the first PAN ID and the second PAN ID is created through a hash algorithm and the indication message may include at least any one of a conflicted PAN ID or an error code indicating a conflict.

Also, in the present invention, the hash algorithm may be performed through an IEEE address and a 16-bit hash table.

Also, in the present invention, the first message and the second message may be transmitted in an ad-hoc manner.

According to another aspect of the present invention, there is provided a coordinator for avoiding a personal area network identifier (PAN ID), including: a radio frequency (RF) communication unit configured to communicate with the exterior wiredly or wirelessly; and a processor functionally connected to the RF communication unit, wherein the processor creates a first PAN ID, receives a message including a second PAN ID from a source coordinator, and compares the first PAN ID with the second PAN ID included in the received message, and when the first PAN ID is the same as the second PAN ID according to the comparison result, the processor transmits an indication message related to a PAN ID conflict to the source coordinator, wherein at least any one of the first PAN ID and the second PAN ID is created through a hash algorithm and the indication message may include at least any one of a conflicted PAN ID or an error code indicating a conflict.

Also, in the present invention, the hash algorithm may be performed through an IEEE address and a 16-bit hash table.

Also, in the present invention, the processor may perform negotiation related to a change in a PAN ID with the source coordinator; and determine a coordinator for changing a PAN ID according to a negotiation result.

Also, in the present invention, the coordinator for changing a PAN ID may be determined on the basis of at least any one of the number of nodes of a personal area network (PAN) and remaining battery capacity.

Also, in the present invention, the message may be transmitted in an ad-hoc manner.

Also, in the present invention, the message may be periodically transmitted from the source coordinator.

According to another aspect of the present invention, there is provided a coordinator for avoiding a personal area network identifier (PAN ID), including: a radio frequency (RF) communication unit configured to communicate with the exterior wiredly or wirelessly; and a processor functionally connected to the RF communication unit, wherein the processor receives a first message including a first PAN ID from a first source coordinator, receives a second message including a second PAN ID from a second source coordinator, and compares the first PAN ID with the second PAN ID, and when the first PAN ID is the same as the second PAN ID according to the comparison result, the processor transmits an indication message related to a PAN ID conflict to the first source coordinator and the second source coordinator, wherein at least any one of the first PAN ID and the second PAN ID is created through a hash algorithm and the indication message may include at least any one of a conflicted PAN ID or an error code indicating a conflict.

Advantageous Effects

In the method and apparatus for creating a personal area network identifier (PANID) of a network in a wireless communication system according to embodiments of the present invention, the following advantages may be obtained.

According to the present invention, a coordinator of a network may create a unique PANID.

Also, according to the present invention, each coordinator may create a unique PANID using a MAC address of a network.

Also, according to the present invention, a conflict that occurs between PANIDs in a network may be resolved.

Also, according to the present invention, when a conflict occurs between PANIDs in a network, the conflict may be discovered and a PANID may be created again.

Also, according to the present invention, when a conflict occurs between PANIDs in a network, a PANID may be created again and transmitted to a different coordinator.

DESCRIPTION OF DRAWINGS

FIGS. 1 and 2 are views illustrating a structure of a network in a wireless communication system, in which FIG. 1 is a view illustrating an example of a network structure in a wireless communication system and FIG. 2 is a view illustrating an example of types of network topology.

BEST MODES

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, an electronic device related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

In this disclosure throughout, a wireless communication system refers to an electric communication scheme based on electromagnetic waves as a medium. That is, the wireless communication system is a type of communication scheme for exchanging information such as a signal, a code, an image, and a voice through radio waves without passing through an electric line between two or more specific spots. The wireless communication system may include Wi-Fi, Bluetooth, ZigBee, Infrared Data Association (IrDA), radio-frequency identification (RFID), and near-field communication (NFC).

Figure 1:
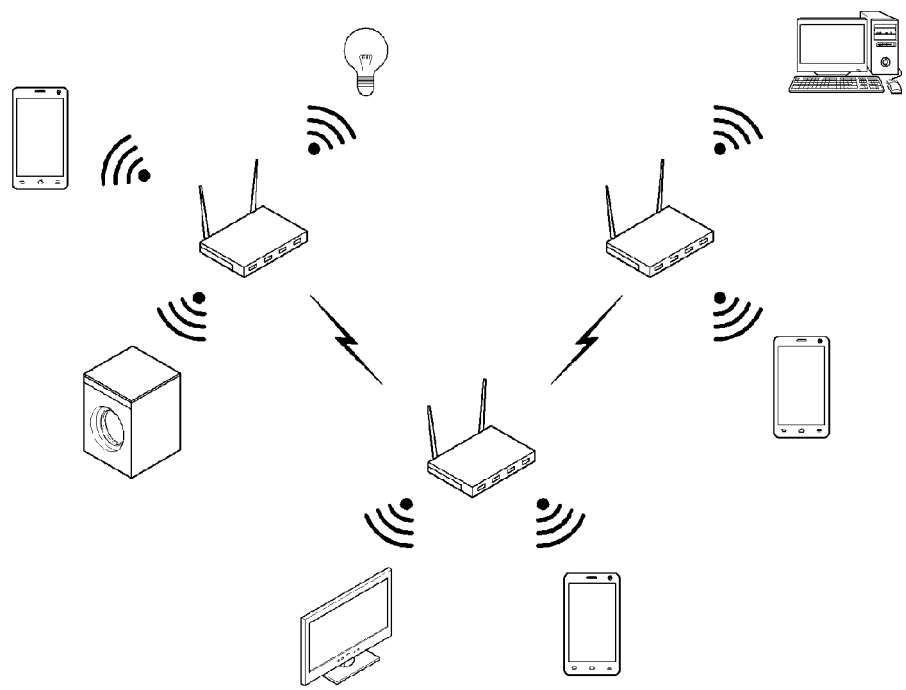
Figure 2:
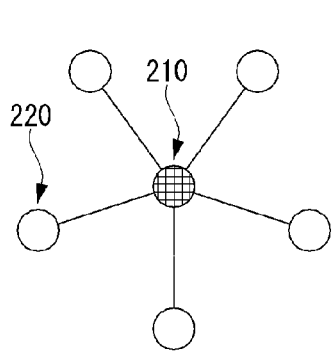
Figure 2:
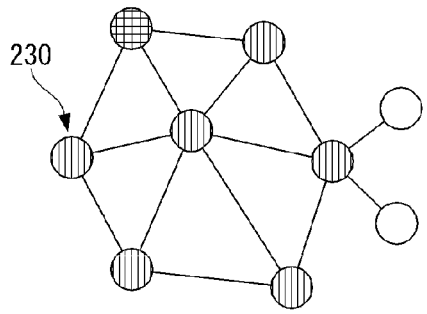
Figure 2:
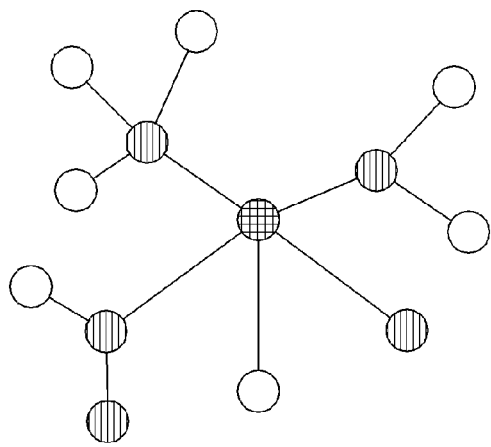

FIGS. 1 and 2 are views illustrating a structure of a network in a wireless communication system, in which FIG. 1 is a view illustrating an example of a network structure in a wireless communication system and FIG. 2 is a view illustrating an example of types of network topology.

Referring to FIG. 1, a configuration of a wireless communication system is illustrated. The wireless communication system may be variously configured from a home network to an extensive network. Hereinafter, ZigBee, a short-range wireless communication, will be described as an example.

ZigBee is a standard technology for home automation and a data network having a low transfer rate. Based on ZigBee, lighting control, home security system, and VCR may be turned on and off through a single operation by a single button anywhere in a house, and home automation may be conveniently used by call connection through the Internet.

That is, ZigBee is a technology implementing short-range wireless communication in a limited space. ZigBee features low power, a very small size, and low cost. In detail, ZigBee allows for data transmission at a rate of 250 kbps in a radius of 10 to 20 meters and connection of 65,000 or more nodes.

Also, a frequency band uses 2.4 GHz and 868/915 MHz in a dual-PHY form, a modem type is a direct sequence-spread spectrum (DS-SS), and a data transfer rate is 20 to 250 bps.

An example of a ZigBee network structure will be described with reference to FIG. 2. The ZigBee network may be classified as (a) star type network, (b) cluster-tree type network, and (c) a mesh type network.

The network topology types illustrated in FIG. 2 are an example, and there may be any other network topology structure.

A network may generally include a coordinator, a router, and an end device, and the device may be classified as a full function device (FFD) and a reduced function device (RFD) according to performance.

The FFD may be used by all of the coordinator 210, the router 230, and the end device 220, and the RFD may be used by the end device 220, and since a simple function is implemented, a limited protocol function may be supported.

The coordinator 210 serves as a root of the network. The coordinator 210 serves to form the network, collect information from the router 230 or the end devices 220, and store and manage network information.

The router 230 stores a data route of the network and temporarily transmits data to the coordinator 210 and the end device 220 according to the stored route. If necessary, the router may operate as a coordinator.

The end device 220 may serve to forward obtained information to the coordinator 210 or the router 230, does not store a network route.

As for the network structure, the star type network (a) performs communication in such a manner that the end device 220 forwards every packet to the coordinator 210 and has a disadvantage in that only one route is present between nodes, although it is simple. In the case of the cluster-tree type network (b), when the end device 220 forwards a packet to the router 230, the router 230 searches for a table of the end device 220, and when the same table is present, the router 230 forwards the packet to a corresponding node. If the same table is not present, the router 230 may forward the packet to the coordinator 210.

In the mesh type network (c), several routes are present among nodes, and if one route fails, a packet may be forwarded to a different route.

The mesh type network may be considered as a sort of ad-hoc network. Here, the ad-hoc network refers to a network having an autonomous structure in which nodes communicate with each other without an intervening control node therebetween.

The mesh network may be classified as three types depending on an element constituting a network; a general ad-hoc network, a sensor mesh network including a plurality of sensor nodes, and a mesh network including fixed or mobile nodes based on a wireless scheme.

The ad-hoc network mainly refers to an autonomous network without a fixed node (that is a node connected in a wired manner), among mesh networks. As a network configuration is changed, network topology is dynamically changed and subscription to or withdrawal from a network is free. However, since topology is continuously changed, the ad-hoc network is disadvantageous in that complexity of routing is increased and the ad-hoc network is not inappropriate for the purpose of mass transmission. The ad-hoc network may be largely used in an emergency environment in which an infrastructure is not established, like a military sector, or in case of disaster.

The sensor mesh network is a mesh network including a plurality of sensor nodes, and the nodes have functions such as networking, computing, and sensing. A small, lightweight sensor is largely positioned in an area in which a communication infrastructure is not established, and transmits a small amount of information, and thus, a mesh network type is effective therefor. A network configuration thereof is similar to that of the ad-hoc network but the number of nodes is greater, and since low power communication is used, fresh supply of electric power may not be required for years in some cases. The sensor mesh network may be used for various purposes such as adjustment of a temperature or electric power of a building, monitoring of plant facilities, process management, intrusion detection, and management of public facilities.

The wireless mesh network includes fixed or mobile nodes based on a wireless scheme, and performs wireless broadband networking by predefined topology. Here, each device/node provides processing power and a memory and shares routing information, allowing for multi-hopping.

In ZigBee, a network unit constituting the smallest communication configuration in the aforementioned network type is defined as a personal area network (PAN), and in a single PAN, a plurality of end devices are centered on a PAN coordinator (PC) and connected to the PC in the star type (a).

That is, the PC directly controls the end devices of the corresponding PAN, and allows for ad-hoc communication through communication with an external adjacent PAN.

Also, packets transmitted by all the end devices of the PAN should be forwarded only to the PC of the corresponding PAN, and in order to prevent a node of an adjacent PAN from receiving the packet, a unique PANID is defined in ZigBee.

Here, however, a scheme of creating the unique PANID is not specified, and when it is considered that a large-scale ad-hoc network exists, a certain PANID cannot know every other PANID, and thus, creation of a unique PANID is not guaranteed.

Also, a PANID defined in ZigBee is configured as 2-byte system, making it fundamentally impossible to create a unique PANID. Thus, a PANID conflict problem may arise, and thus, a method for solving the problem is required.

Thus, the present invention proposes a method for creating a unique PANID of a network in a wireless communication system and a method and apparatus for resolving a conflict that occurs between PANIDs.

Figure 3:
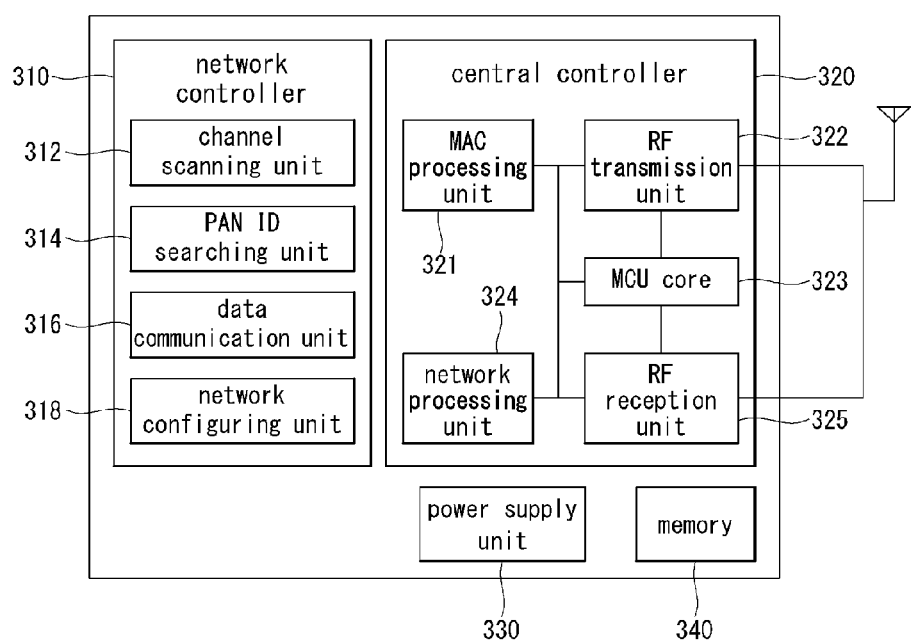
FIG. 3 is an internal block diagram of an example of an electronic device, to which the present invention is applied.

FIG. 3 is an internal block diagram of an example of an electronic device, to which the present invention is applied. Here, the electronic device may be a coordinator, a router, or an end device.

Referring to FIG. 3, the electronic device 300 may include a central controller 320 transmitting and receiving wireless data to and from an external device and processing transmission and reception data, a network controller 310 configuring and managing a network, a power supply unit 330 supplying power of the electronic device 300, and a memory 340 storing data.

The central controller 320 may include a main controller (MCU) core 323 managing and controlling an overall operation of the electronic device 300, a radio frequency (RF) transmission unit 322 and an RF reception unit 325 wirelessly transmitting and receiving data, a media access control (MAC) processing unit 321 managing MAC and higher data, and a network processing unit 324 relaying data between the RF transmission unit 322/the RF reception unit 325 and the MAC processing unit 321.

The MAC processing unit 321 may perform a MAC function provided by a MAC layer to allow various network configurations to be used, and manage data of a higher layer.

The network processing unit 324 may transmit information of an application layer to the MAC processing unit 321, and transmit information received from the RF reception unit 325 to the application layer, thus relaying data between the application layer and the MAC processing unit 321.

The memory 340, a medium storing various types of data of the electronic device 300, may store a program for operating the central controller 320 and the network controller 310, an application, a general file, and input/output data.

The memory 340 may include at least one type of storage mediums among a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The network controller 310 may include a channel searching unit 312 and a PAN ID searching unit 314 searching for a communication frequency channel and a PAN ID and setting a communication frequency channel and a PAN ID, a data communication unit 316 performing data communication among a coordinator, a router, and an end device, and a network configuring unit 318 managing and controlling an overall network configuration when a mesh network is established.

The channel searching unit 312 and the PAN ID searching unit 314 may serve to search for a frequency channel and a PAN ID used in an adjacent area in which a network is intended to be established, and select a frequency channel and a PAN ID not used in the adjacent area.

When a communication frequency channel and a PAN ID are set through the channel searching unit 312 and the PAN ID searching unit 314, the network configuring unit 318 may configure a mesh network with the set channel and PAN ID, and store and manage the configured network information in the memory 340.

The present invention may provide a method and apparatus for creating, by the coordinator, a PANID for transmitting and receiving data to and from the end device and discovering a PAN ID conflict through a PAN ID of received through the RF transmission unit 322 and RF reception unit 325.

Figure 4:
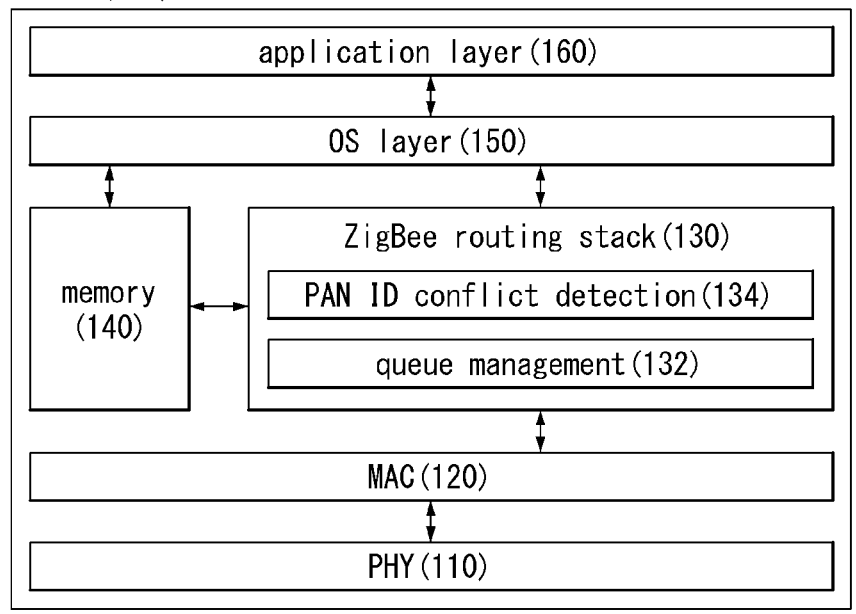
FIG. 4 is a view schematically illustrating a functional internal configuration of an electronic device, to which the present invention is applied.
Figure 4:
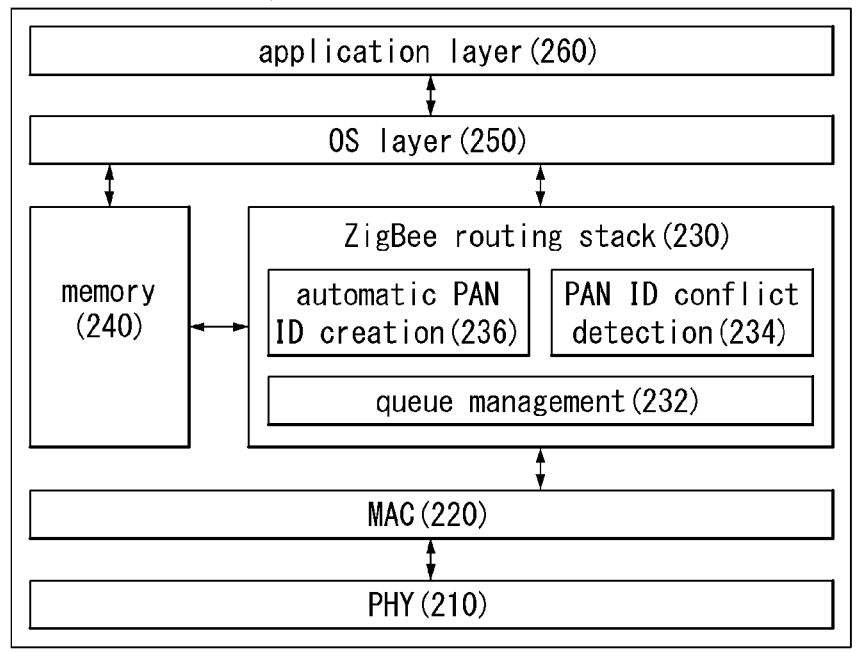

FIG. 4 is a view schematically illustrating a functional internal configuration of an electronic device, to which the present invention is applied.

An end device 100 (hereinafter, referred to as a "node") and a coordinator 200 may include PHY layers 110 and 210, MAC layers 120 and 220, routing stacks 130 and 230, memories 140 and 240, operating systems (Oss) 150 and 250, and application layers 160 and 260, respectively.

The PHY layers 110 and 210, physical layers directly transmitting and receiving data wirelessly, may serve to activate or deactivate a transceiver as a wireless transmitter/receiver, detect energy of a current channel, select a channel frequency, and access a clear channel for carrier sense multiple access-collision avoidance (CSMA-CA).

Here, CSMA-CA refers to a method in which a flow of data is sensed, and when a network is not in use, a preliminary signal is first transmitted, rather than transmitting a packet immediately, to avoid a packet collision during data transmission.

The MAC layers 120 and 220, layers accessing a wireless channel using the CSMA-CA mechanism, may support subscription to a PAN and release of subscription, provide a stable link between two existing MAC peers, support device security, and perform synchronization on a beacon. Also, the MAC layer 220 of the coordinator 200 may generate a network beacon.

The routing stacks 130 and 230 may include queue managements 132 and 232 and PAN ID conflict detections 134 and 234, respectively, and the routing stack 130 of the coordinator 200 may further include an automatic PAN ID creation 236.

The queue managements 132 and 232 may operate a queue for transmitting and receiving data. The queue managements 132 and 232 may transmit a queue request to a medium device (IMD) and receive a response from the medium device IMD, or may receive a queue request from the medium device IMD and transmit a response thereof.

The PAN ID conflict detections 134 and 234 may determine whether a PAN ID included in data received by the node 100 or the coordinator 200 match a PAN ID of the coordinator 200.

The automatic PAN ID creation 236 of the coordinator 200 may create a PAN ID for configuring a network with the node 100, and in the present invention, each coordinator 200 may create a unique PAN ID using a MAC address, and when a conflict between PAN IDs is detected by the PAN ID conflict detections 134 and 234, each coordinator 200 may create a new PAN ID.

Figure 5:
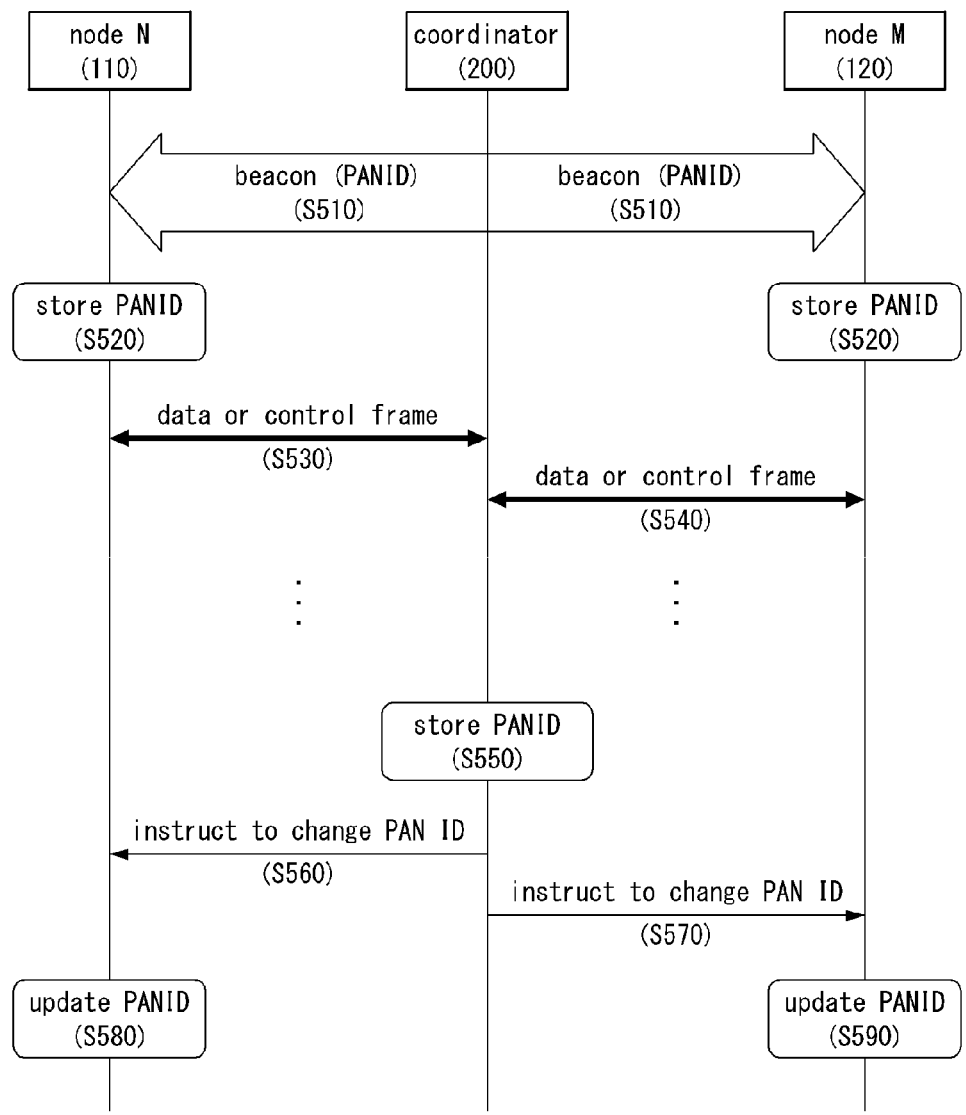
FIG. 5 is a flow chart illustrating an example in which a coordinator creates a personal area network identifier (PANID) in a network of a wireless communication system.

FIG. 5 is a flow chart illustrating an example in which a coordinator creates a PANID in a network of a wireless communication system.

Referring to FIG. 5, whenever a PAN ID is changed, a coordinator of the PAN may inform each node about the change in the PAN ID.

In detail, in ZigBee communication, every communication may be provided in an ad-hoc form in order to accommodate an extensive network scale. A data transfer scheme in the ad-hoc form is a scheme in which a communication device positioned in the middle of a route from a source to a destination forwards data therebetween in a hop-by-hop manner.

In ZigBee, the smallest network unit is defined as a PAN, a single PAN may include a single PAN coordinator 200 and a plurality of nodes 110 and 120, and an identifier representing the PAN is defined as a PANID. A network type of the single PAN is a star type.

In a case in which a destination of data transmitted by a certain node exists outside of the corresponding PAN, PAN coordinators connected to each other may forward data in an ad-hoc manner.

Thus, a PAN ID is an address essential in performing routing. The coordinator 200 transmits the PAN ID to the nodes 110 and 120 through a beacon.

Upon receiving the PAN ID, the node N 110 and the node M 120 store the received PAN ID (S520). This is to prevent the node N 110 and the node M 120 from receiving data transmitted from a coordinator other than the coordinator 200. That is, the node N 110 and the node M 120 may not receive data having a PANID different from the PANID of the coordinator 200.

Upon storing the PANID, the node N 110 and the node M 120 may receive data or a control frame from the coordinator 200 (S530 and S540).

The coordinator 200, which has transmitted data or a control frame to the node N 110 and the node M 120, may change the PANID (S550).

The changed PANID may be transmitted to the node N 110 and the node M 120 through an indication.

The indication may include parameters of Table 1 below.

TABLE 1

| Name | Type | Valid range | Description |
| --- | --- | --- | --- |
| Status | Status | Status code | Error code related to fail |
| Networkaddress | Integer | 0x0000-0xffff | Network address (16 bit) of device related to status information |

The Networkaddress is a network address having 16 bits, in which network addresses of the node N 110 and the node M 120.

The Status may have values of Table 2 below, as parameters indicating what kind of error has occurred.

TABLE 2

| Value | Status Code |
| --- | --- |
| 0x00 | No route available |
| 0x01 | Tree link failure |
| 0x02 | Non-tree link failure |

TABLE 2-continued

| Value | Status Code |
| --- | --- |
| 0x03 | Low battery level |
| 0x04 | No routing capacity |
| 0x05 | No indirect capacity |
| 0x06 | Indirect transaction expiry |
| 0x07 | Target device unavailable |
| 0x08 | Target address unallocated |
| 0x09 | Parent link failure |
| 0x0a | Validate route |
| 0x0b | Source route failure |
| 0x0c | Many-to-one route failure |
| 0x0d | Address conflict |
| 0x0e | Verify addresses |
| 0x0f | PAN identifier update |
| 0x10 | Network address update |
| 0x11 | Bad frame counter |
| 0x12 | Bad key sequence number |
| 0x13-0xff | Reserved |

Referring to Table 2, in order to inform the node N 110 and the node M 120 about the change in the PANID, the coordinator 200 may include "0x0f" of Table 2 in the Status Code and transmit the same to the node N 110 and the node M 120 (S560 and S570).

Here, as the PANID, a unique PANID preventing a node of an adjacent PAN from receiving data transmitted from the coordinator 200 should be set.

Also, since the PAN ID of the coordinator 200 has 2 bytes, the PANID may be the same as a PANID of a different coordinator. That is, the PANID of the coordinator 200 may conflict with a PANID of a different coordinator.

Hereinafter, a method for setting the unique PANID of the network in a wireless communication system and a method for resolving the problem of PANID conflict will be described.

Figure 6:
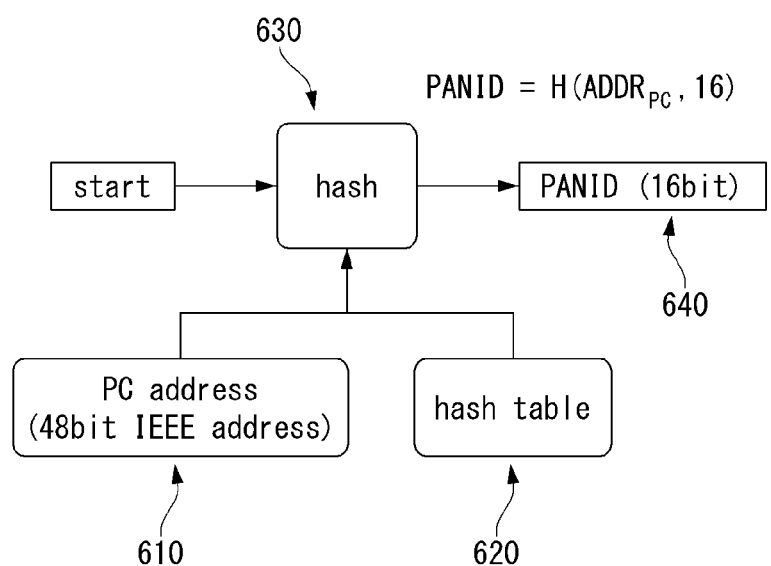
FIGS. 6 and 7 are views illustrating an example of a method of creating a PANID in a network of a wireless communication system, to which the present invention is applied.
Figure 7:
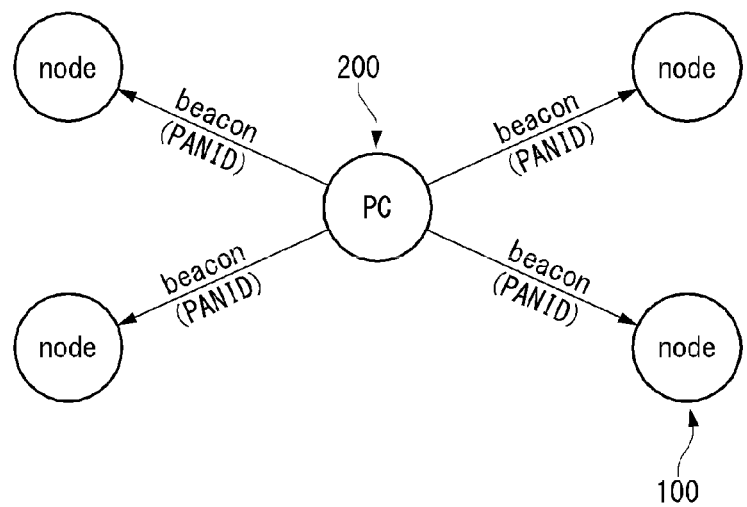

FIGS. 6 and 7 are views illustrating an example of a method of creating a PANID in a network of a wireless communication system, to which the present invention is applied.

Referring to FIGS. 6 and 7, a unique PANID of a network may be created using a hash algorithm, and a changed PANID may be transmitted to each node through a beacon.

In detail, ZigBee uses an IEEE 802.15.4-based PHY/MAC technology, and every node has a 48-bit IEEE address.

Although the IEEE address may not provide a unique address to every infinite node, but it has high uniqueness compared with a PANID, and thus, a PAND may be created by using the IEEE address as a seed through the hash algorithm.

That is, through a hash algorithm 630 using IEEE address 610 and 16-bit hash table 620, a 16-bit PANID 640 may be created. The hash algorithm may be expressed by Equation 1 below.

$$\text{PANID} = H(\text{ADDR}_{PC}, 16) \quad \text{[Equation 1]}$$

The hash algorithm or the hash function is an algorithm or a function compressing certain data to an output value having a fixed length, which creates a result using a method of cutting data and replacing it or changing a position thereof, and such a result is termed a "hash result".

The hash algorithm or the hash function is used for verifying integrity of data or authenticating a message, and two qualities of unidirectionality and avoidance of strong collision should be satisfied.

In the present invention, the 48-bit IEEE address may be compressed to create a 16-bit PANID. In this manner, a PANID able to provide uniqueness within a range of a size of 65536, the number that can be expressed by 16 bits, may be created.

The PANID created by the procedure may be included in a beacon which is periodically transmitted by the coordinator 200 through communication of the MAC layer of the PAN and transmitted to every node 100 of the same PAN.

In addition to the hash algorithm, in order to create the dynamic PANID, a method of creating a certain PANID, creating a PANID using a clock time stamp value with a device, creating a PANID by selecting a specific portion (for example, a higher or lower portion) of an IEEE address by 2 bytes (16 bits), or creating a PANID by combining IEEE address to 2 bytes (16 bits) may be used.

The coordinator 200 created the PANID through the method may further lower a local PANID conflict occurrence probability through a discovery procedure with respect to a neighbor coordinator thereof.

Figure 8:
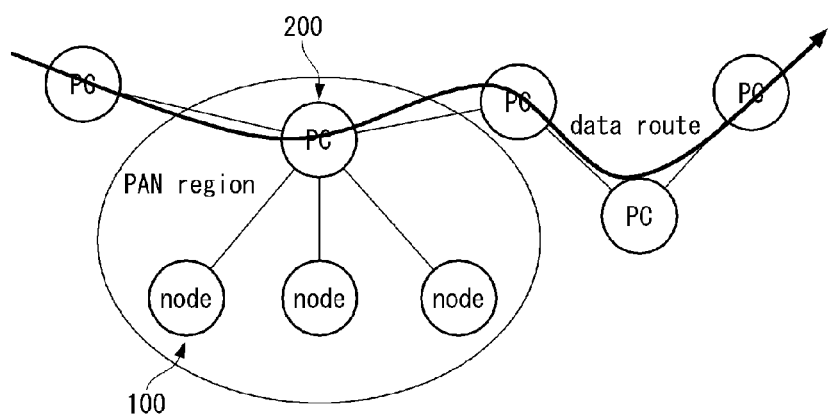
FIGS. 8 and 9 are views illustrating a method for resolving a PANID conflict in a network of a wireless communication system, to which the present invention is applied.
Figure 9:
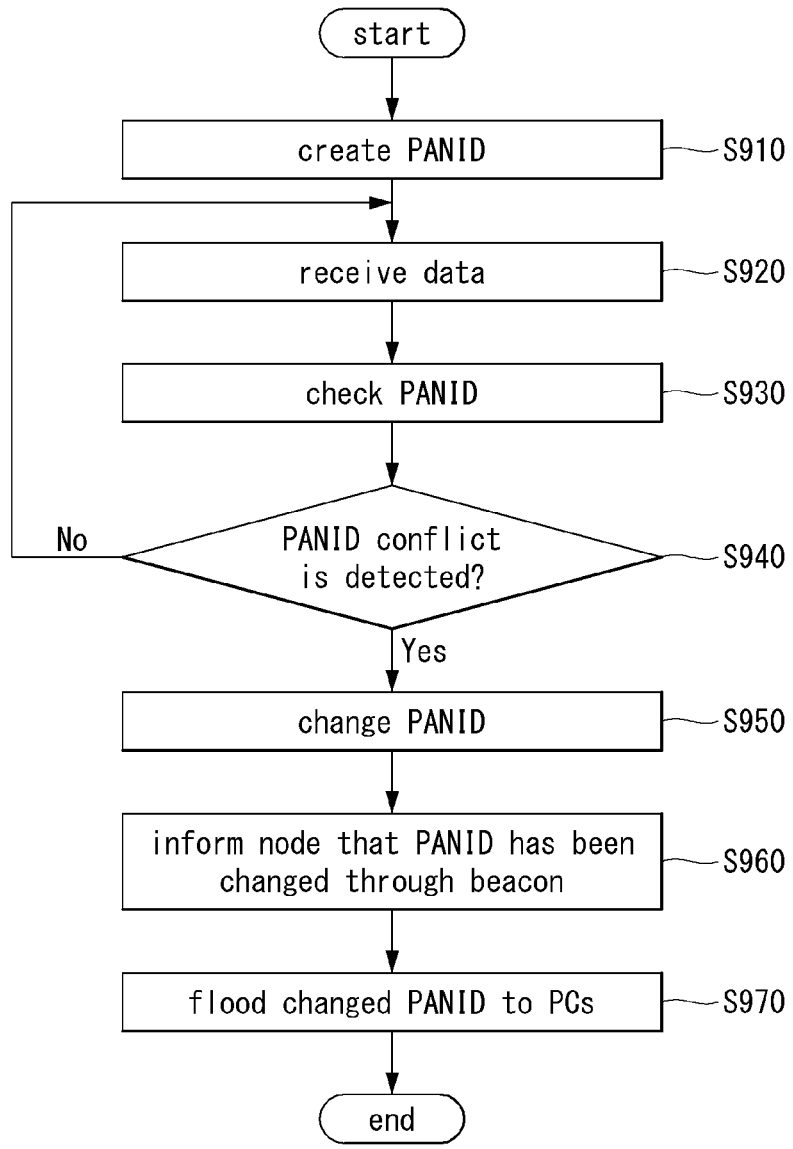

FIGS. 8 and 9 are views illustrating a method for resolving a PANID conflict in a network of a wireless communication system, to which the present invention is applied.

Referring to FIGS. 8 and 9, the PAN coordinator may check every packet received from the outside, and if a PANID is the same, the PAN coordinator may change the PANID.

The coordinator of the PAN uses a data transfer scheme in an ad-hoc form. That is, in this scheme, a coordinator positioned in the middle of a route from a source to a destination forwards a packet.

The PC 200 as a coordinator of the PAN may check every data packet received through a data route and determine whether the PANID thereof conflicts with a PANID of a coordinator that transmits data.

A specific flow thereof will be described with reference to FIG. 9. The PC 200 may create a PAN ID according to the method described above with reference to FIG. 6 (S910). After creating the PANID, the PC 200 may transmit the created PANID to nodes of the same PAN through a beacon.

After creating the PANID, the PC 200 may receive data from a different PC (S920). The data may be transmitted to the PC 200 as a destination, or may be data transmitted to a different PC as a destination.

The PC 200 may check a PANID of the received data (S930) and determine whether the PANID of the received data is the same as the PANID created by the PC 200 (S940). When the PANID of the received data is different from the PANID created by the PC 200, there is no conflict between the PANIDs, and thus, the PC 200 may continue to receive data.

However, when the PANID of the received data is the same as the PANID created by the PC 200, the PC 200 may recognize that the PANIDs conflict with each other, and in order to resolve the conflict, the PC 200 may change the PANID (S950). Here, the PANID may be changed through the hash algorithm described above with reference to FIG. 6.

When the PANID has been changed, the PC 200 transmits a beacon including the changed PANID in the MAN layer in order to inform the nodes of the PAN (S960).

After the internal PAN application regarding the changed PANID is completed, the PC 200 floods a message in a routing layer to every PC present in the entire network in order to inform the entire network about the changed PANID (S970).

Thus, when the PANIDs overlap, conflicts between PANIDs may be resolved through this process, and a unique PANID may be created through the hash algorithm described above with reference to FIG. 6.

In another embodiment of the present invention, after step S940, the PC 200 may transmit a message to a source device which has transmitted the data to cause the source device to change the PANID.

In another embodiment of the present invention, after step S940, the PC 200 may transmit a negotiation message for creating a PANID to the source device which has transmitted the data, and a device, among the PC 200 or the source device, determined through a negotiation may create a PANID in the manner described above with reference to FIG. 6.

Here, matters to be considered in the negotiation for creating the PANID may be the number of nodes, remaining energy, and the like.

Figure 10:
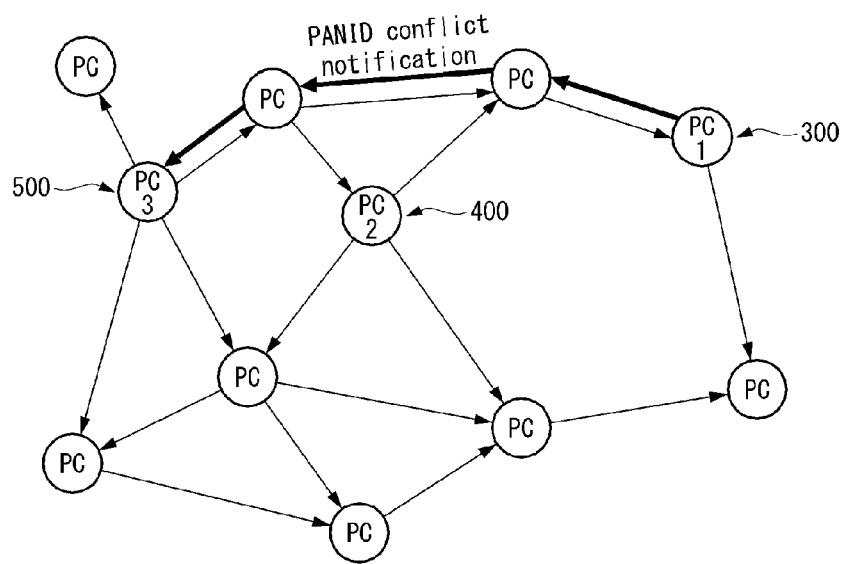
FIGS. 10 and 11 are views illustrating a method for resolving a PANID conflict that reoccurs after a PANID is re-created.
Figure 11:
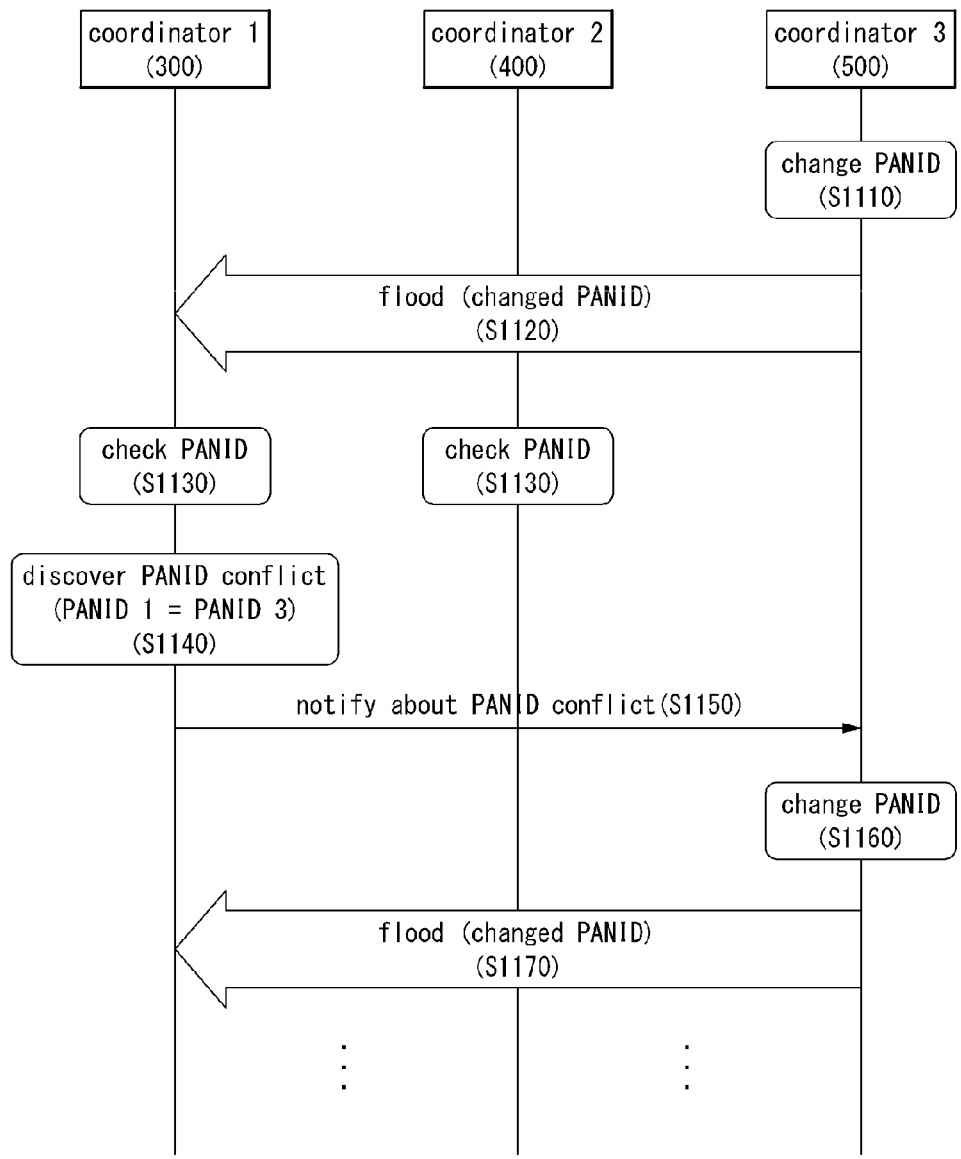

FIGS. 10 and 11 are views illustrating a method for resolving a PANID conflict that reoccurs after a PANID is re-created.

Referring to FIGS. 10 and 11, even after re-creation of a PANID, the PANID of the PC 200 is the same as that of a different coordinator so a PANID conflict occurs, the step of creating and transmitting a PANID may be repeated to solve the problem.

In detail, a coordinator 3 500 may change a PANID as described above with reference to FIG. 9, and transmit the changed PANID to other coordinators through a flooding message. Here, the coordinator 1 300, which has received the PANID created by the coordinator 3 500, may check whether a PANID 1, a PANID of the coordinator 1 300 itself, and a PANID 3, a PANID created by the coordinator 3 500.

When the PANID 1 is the same as the PANID3 of the coordinator 3 500, the coordinator 1 300 may notify the coordinator 3 500 about the same PANID, thereby solving a PANID conflict.

As for a specific flow with reference to FIG. 11, the coordinator 3 500 may check a PANID conflict through steps S910 to S940, and change the PANID thereof (S1110). Here, the PANID may be changed through the hash algorithm described above with reference to FIG. 6.

The coordinator 3 500 transmits the changed PANID through a flooding message to the other coordinators (S1120). Upon receiving the PANID 3 from the coordinator 3 500, the coordinator 1 300 and a coordinator 2 400 check whether PANIDs thereof are the same as the PANID of the coordinator 3 500 (S1130).

When the PANID 1 of the coordinator 1 300 is the same as the PANID 3 of the coordinator 3 500, the coordinator 300 may discover a conflict between the PANIDs (S1140), and notify the coordinator 3 500 about the conflict.

Upon being notified about the PANID conflict, the coordinator 3 500 changes the PANID through the hash algorithm of FIG. 6 (S1160), includes the changed PANID in a message, and floods the message to the other coordinators (S1170).

The procedure of re-changing a PANID described above may be repeatedly performed until the coordinator 3 500 does not receive a notification of a PANID conflict from the other coordinators any longer.

Figure 12:
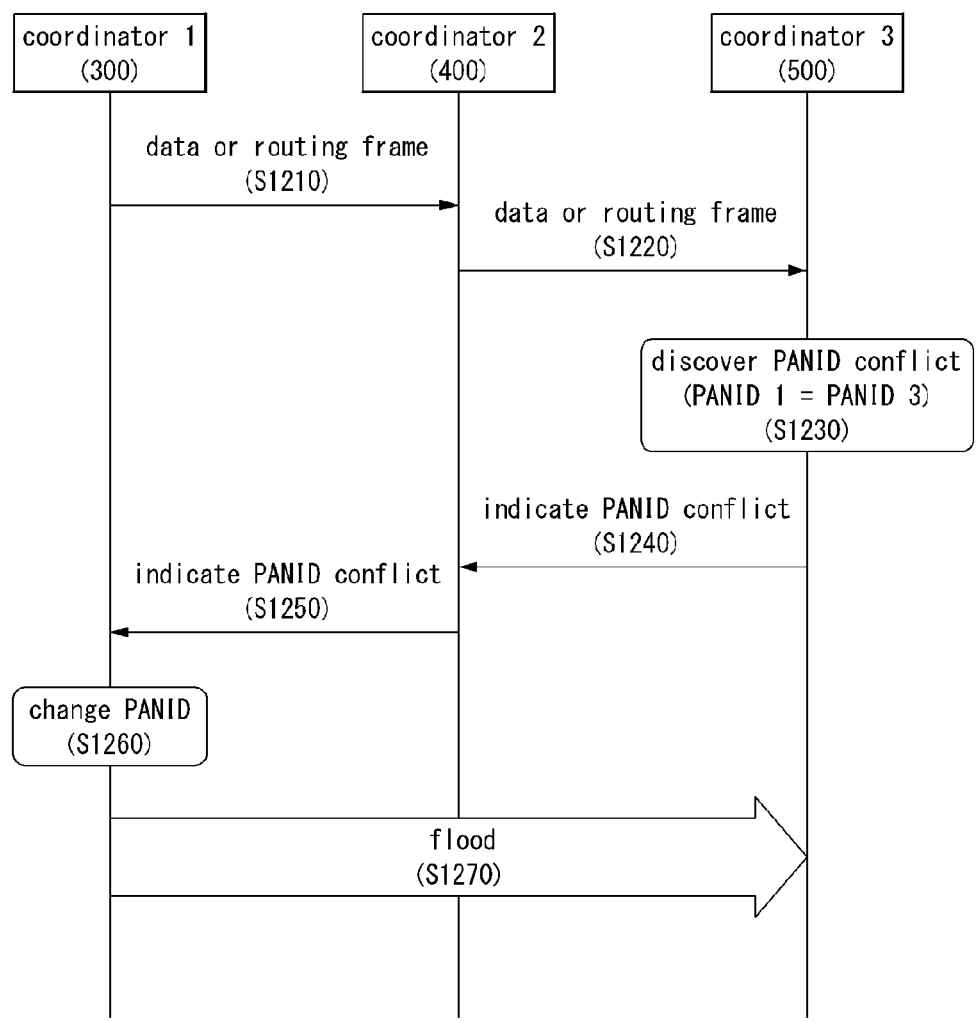
FIG. 12 is a flow chart illustrating an example in which a source coordinator changes a PANID when PANIDS of coordinators overlap in a network of a wireless communication system, to which the present invention is applied.

FIG. 12 is a flow chart illustrating an example in which a source coordinator changes a PANID when PANIDS of coordinators overlap in a network of a wireless communication system, to which the present invention is applied.

Referring to FIG. 12, when a destination coordinator, which has received data transmitted from a source coordinator, discovers a PANID conflict, the destination coordinator may notify the source coordinator about the PANID conflict to change a PANID.

In detail, the coordinator 1 300 transmits data or a routing frame to the coordinator 3 500 positioned at a multi-hop distance in an ad-hoc manner (S1210 and S1220).

Upon receiving the data or the routing frame, the coordinator 3 500 may compare a PANID 1 of the coordinator 1 300 as a source coordinator with a PANID 3, a PANID of the coordinator 3 500 itself. When the PANID 1 is the same as the PANID 3 according to the comparison result, the coordinator 3 500 may inform the coordinator 1 300 about the PANID conflict through an indication message.

The indication message may be transmitted in an ad-hoc manner, like the data or the routing frame (S1240 and S1250).

The indication message may include parameters of Table 3 below.

TABLE 3

| Name | Type | Valid range | Value |
| --- | --- | --- | --- |
| Status | Status | 0x00-0x11 | 0x0d (Address conflict) |
| Network address | Integer | 0x000-0xfff7 | Conflicted PANID |

In Table 3, Status may indicate a status, and in this embodiment, Status may include an error code indicating a conflict between PANIDs. Network address includes a network address of a conflicted coordinator. For example, when the PANID 1 of the coordinator 1 300 is "0x1f" and the PANID 3 of the coordinator 3 500 is "0x1f", the Network address value is "0x1f" and a value of Status may have "0x0d" indicating a PANID conflict.

Upon recognizing that the PANID 1 thereof conflicts with the PANID 3 of the coordinator 3 500, the coordinator 300 may change the PANID thereof through the hash algorithm of FIG. 6 and transmit the changed PANID to every node of the corresponding PAN through a beacon (S1260).

In order to inform the entire network about the changed PANID, the coordinator 1 300 may flood a message including the changed PANID (S1270), and in this case, the message may include parameters as illustrated in Table 4 below.

TABLE 4

| Name | Type | Valid range | Value |
| --- | --- | --- | --- |
| Status | Status | 0x00-0x11 | 0x0f (PAN identifier update) |
| Network address | Integer | 0x000-0xfff7 | Changed PANID |

Figure 13:
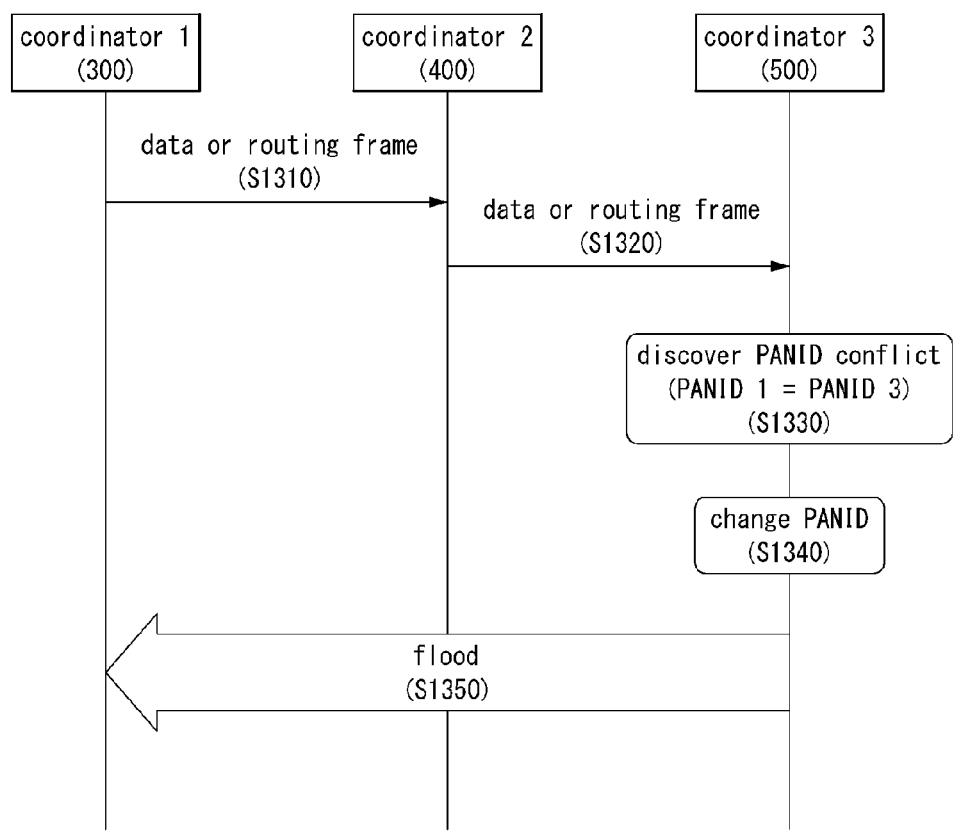
FIG. 13 is a flow chart illustrating an example in which a destination coordinator changes a PANID when PANIDs of coordinators overlap in a network of a wireless communication system, to which the present invention is applied.

FIG. 13 is a flow chart illustrating an example in which a destination coordinator changes a PANID when PANIDs of coordinators overlap in a network, to which the present invention is applied.

Referring to FIG. 13, when a PANID conflict occurs, a destination coordinator may directly change a PANID thereof to resolve a PANID conflict.

Steps S1310 to S1330 of FIG. 13 are the same as steps S1210 to S1230 of FIG. 12, and thus, a description thereof will be omitted.

When the coordinator 3 500 discovers a PANID conflict, the coordinator 3 500 may change a PANID thereof (S1340). Here, the PANID may be changed through the hash algorithm described above with reference to FIG. 6.

After changing the PANID, the coordinator 3 500 floods a message including the changed PANID in order to transmit the changed PANID to every node of the corresponding PAN through a beacon and to inform the entire network about the changed PANID (S1350). In this case, the message may include the parameters such as illustrated in Table 4.

Figure 14:
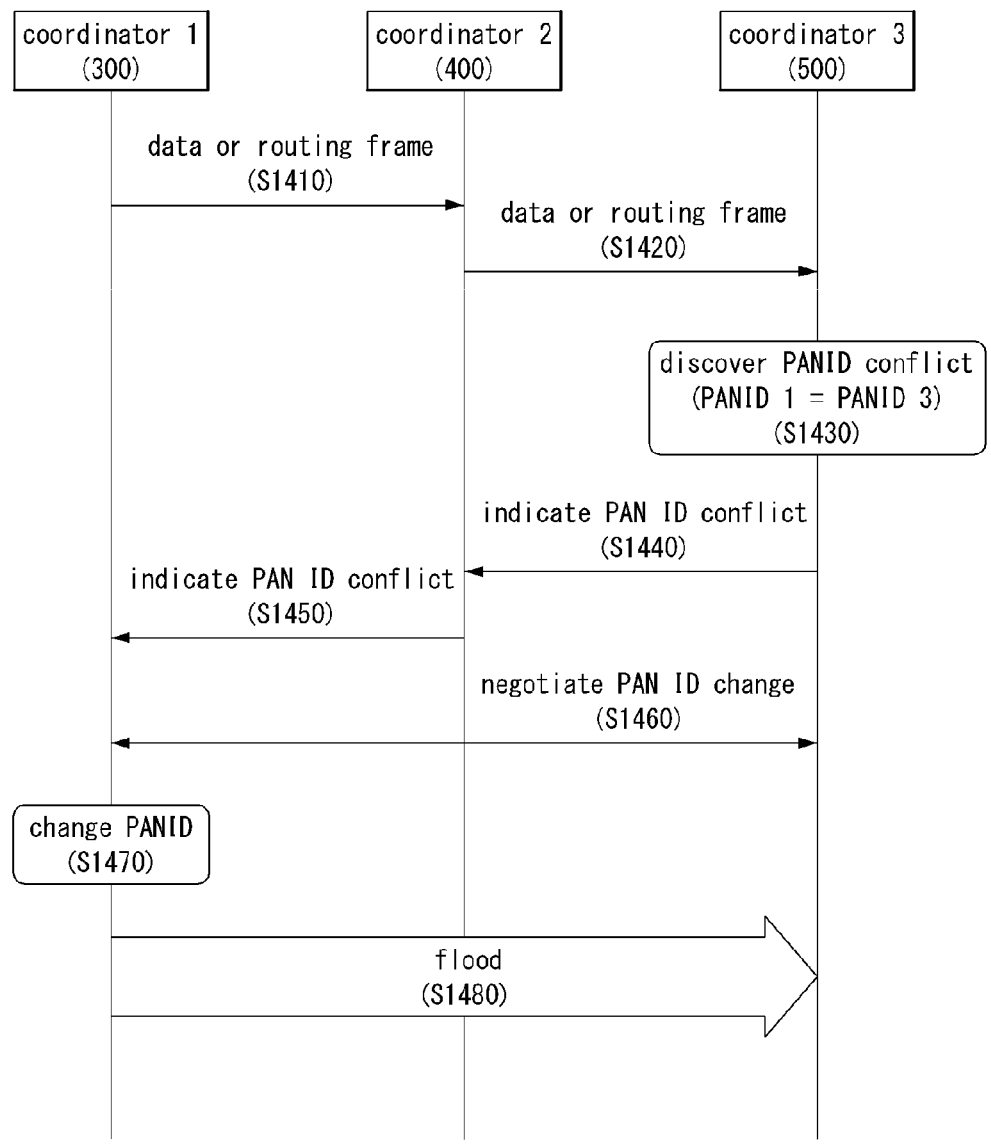
FIG. 14 is a flow chart illustrating an example in which a PANID is changed through a negotiation when PANIDs of coordinators overlap in a network of a wireless communication system, to which the present invention is applied.

FIG. 14 is a flow chart illustrating an example in which a PANID is changed through a negotiation when PANIDs of coordinators overlap in a network of a wireless communication system, to which the present invention is applied.

Referring to FIG. 14, when a PANID conflict occurs, a destination coordinator and a source coordinator may determine a device for changing a PANID through a negotiation.

Steps S1410 to S1450 of FIG. 14 are the same as steps S1210 to S1250 of FIG. 12, and thus, a description thereof will be omitted.

After step S1450, the coordinator 1 300 and the coordinator 3 500 may negotiate about who (i.e., which of them) will change the PANID (S1460).

Through the negotiation, a device for changing a PANID may be determined in consideration of the number of nodes, a remaining battery capacity, and the like.

When the coordinator 1 300 is determined as a coordinator for changing the PANID thereof through the negotiation, the coordinator 1 300 may change the PANID thereof (S1470). Here, the PANID may be changed through the hash algorithm described above with reference to FIG. 6.

After changing the PANID, the coordinator 1 300 floods a message including the changed PANID in order to transmit the changed PANID to every node of the corresponding PAN through a beacon and to inform the entire network about the changed PANID (S1480). In this case, the message may include the parameters such as illustrated in Table 4.

Through the method described above with reference to FIGS. 12 through 14, when a PANID conflict occurs between the source coordinator and the destination coordinator, the PANID may be changed to resolve the conflict and a delay time between the nodes may be reduced. Also, when the PANID is changed, a unique PANID may be created by using the hash algorithm described above with reference to FIG. 6.

Figure 15:
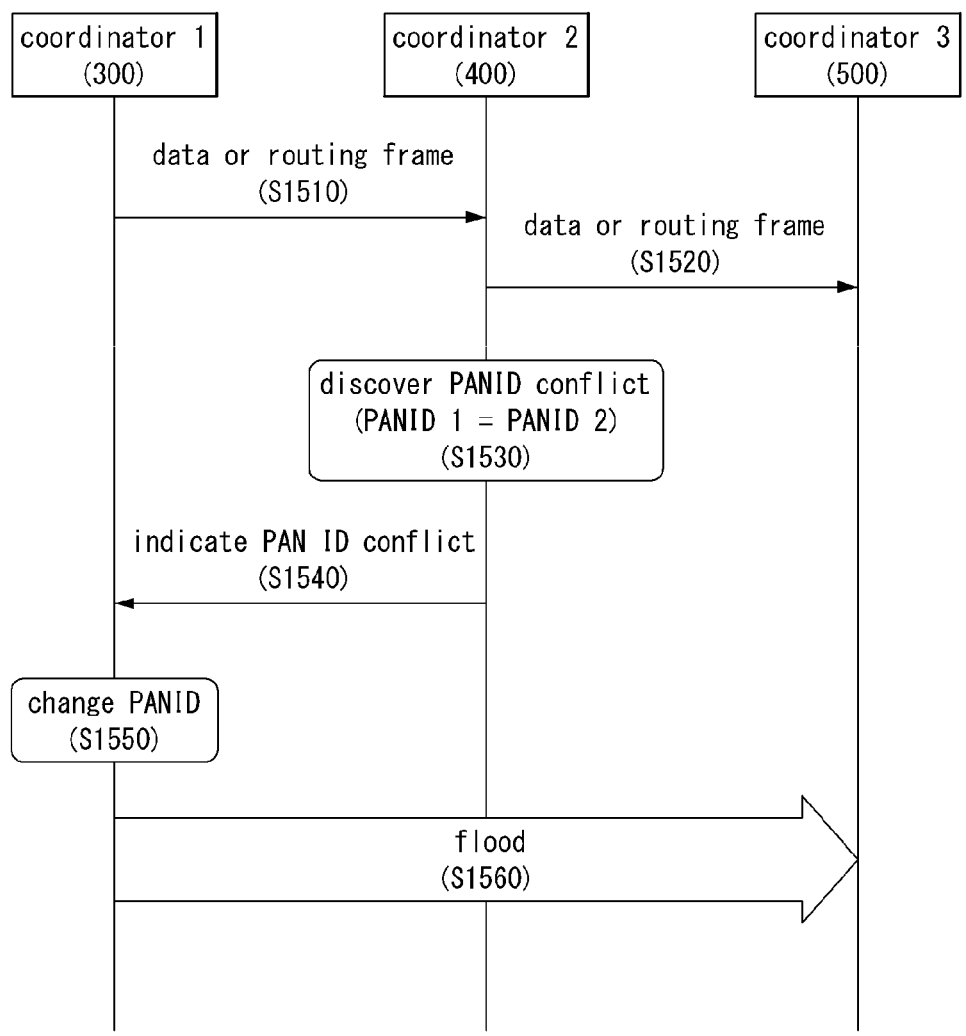
FIG. 15 is a flow chart illustrating another example in which a PANID is changed through a negotiation when PANIDs of coordinators overlap in a network of a wireless communication system, to which the present invention is applied.

FIG. 15 is a flow chart illustrating another example in which a PANID is changed through a negotiation when PANIDs of coordinators overlap in a network of a wireless communication system, to which the present invention is applied.

Referring to FIG. 15, when a PANID conflict is discovered while a source coordinator is transmitting data to a destination coordinator, a PANID may be changed.

In detail, the coordinator 1 300 transmits data or a routing frame to the coordinator 3 500 positioned at a multi-hop distance in an ad-hoc manner (S1510 and S1520).

In this case, even though a PANID of the coordinator 1 300 and a PANID of the coordinator 3 500 are different, if a PANID of the coordinator 2 400 as a forwarder device forwarding data or a routing frame inbetween and the PANID of the coordinator 1 300 are the same, the PANIDs may conflict.

The coordinator 2 400 may overhear the PANID 1 included in a packet forwarded from the coordinator 1 300 and determine that a PANID 2 as a PANID of the coordinator 2 400 is the same as the PANID 1 of the coordinator 1 300, discovering a PANID conflict (S1530).

Upon discovering the PANID conflict, the coordinator 400 may inform the coordinator 1 300 about the PANID conflict through an indication message.

The indication message may be transmitted in an ad-hoc manner like the data or the routing frame (S1540). The indication message may include the parameters of Table 3.

The coordinator 1 300, which has recognized that the PANID thereof conflicts with the PANID of the coordinator 3 500 through the indication message, changes the PANID thereof through the hash algorithm of FIG. 6 and transmits the changed PANID through every node of the corresponding PAN through a beacon (S1550).

In order to inform the entire network about the changed PANID, the coordinator 1 300 may flood a message including the changed PANID (S1560), and in this case, the message may include the parameters illustrated in Table 4.

Figure 16:
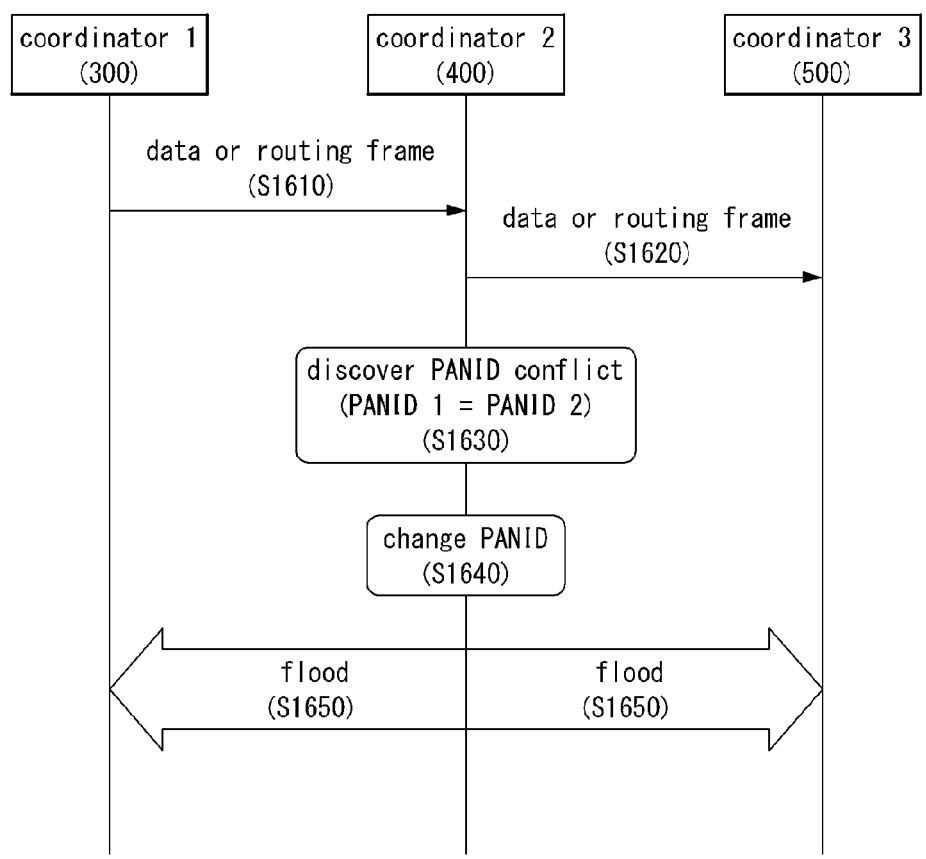
FIG. 16 is a flow chart illustrating an example in which a forwarder coordinator changes a PANID when PANIDs of coordinators of a network overlap in a wireless communication system, to which the present invention is applied.

FIG. 16 is a flow chart illustrating an example in which a forwarder coordinator changes a PANID when PANIDs of coordinators of a network overlap in a wireless communication system, to which the present invention is applied.

Referring to FIG. 16, when a PANID conflict occurs, a forwarder may directly change a PANID to resolve the PANID conflict.

Steps S1610 to S1630 of FIG. 16 are the same as steps S1510 to S1530 of FIG. 15, and thus, a description thereof will be omitted.

When the coordinator 2 400, a forwarder device, discovers a PANID conflict, the coordinator 2 400 may change a PANID thereof (S1640). Here, the PANID may be changed through the hash algorithm described above with reference to FIG. 6.

After changing the PANID, the coordinator 2 400 floods a message including the changed PANID in order to transmit the changed PANID to every node of the corresponding PAN through a beacon and to inform the entire network about the changed PANID (S1650). In this case, the message may include the parameters such as illustrated in Table 4.

Figure 17:
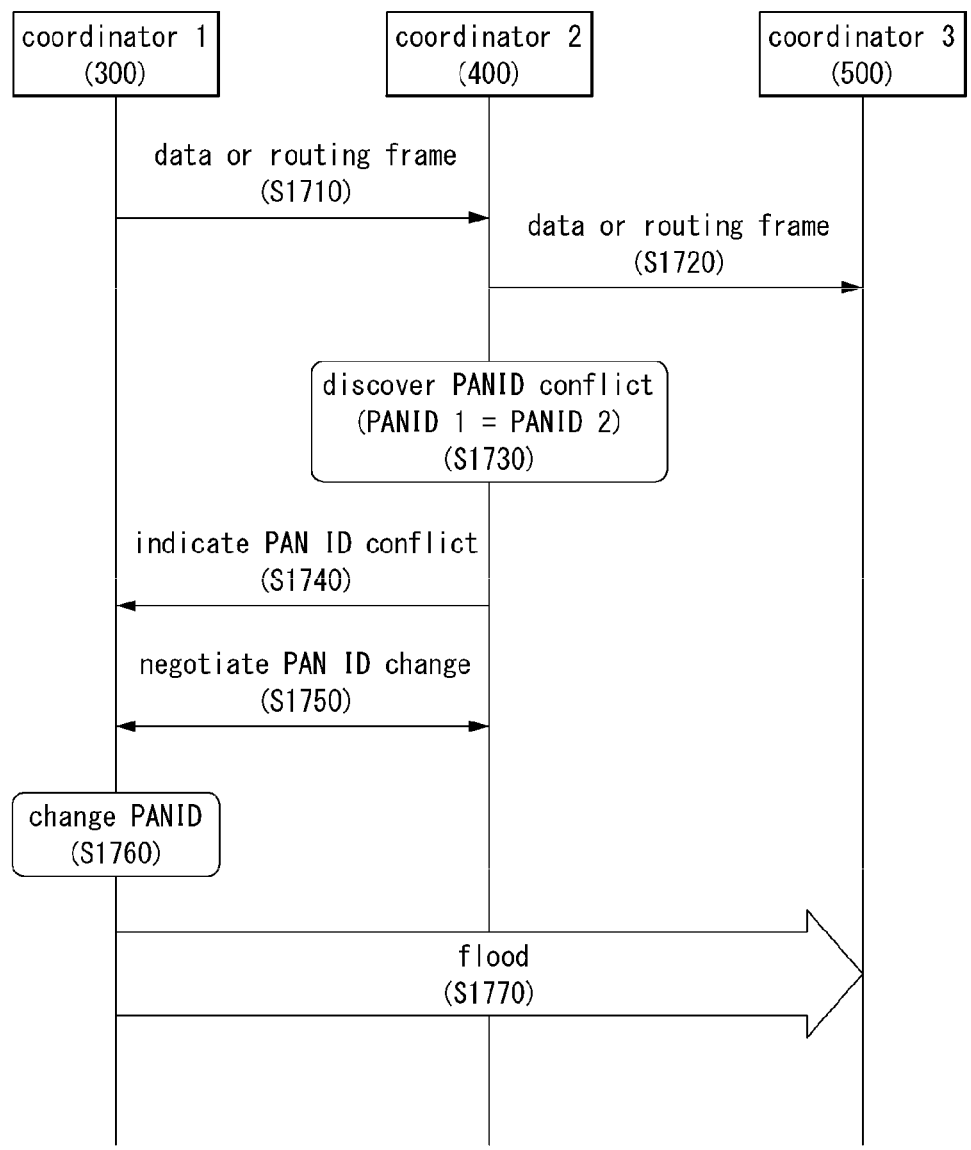
FIG. 17 is a flow chart illustrating another example in which a PANID is changed through a negotiation when PANIDs of coordinator of a network overlap in a wireless communication system, to which the present invention is applied.

FIG. 17 is a flow chart illustrating another example in which a PANID is changed through a negotiation when PANIDs of coordinator of a network overlap in a wireless communication system, to which the present invention is applied.

Referring to FIG. 17, when a PANID conflict occurs, a forwarder coordinator and a source coordinator may determine a device for changing a PANID through a negotiation.

Steps S1710 to S1740 of FIG. 17 are the same as steps S1510 to S1540 of FIG. 15, and thus, a description thereof will be omitted.

After step S1540, the coordinator 1 300 and the coordinator 2 400 as a forwarder coordinator negotiate as to who (i.e., which of them) will change the PANID (S1750).

Through the negotiation, a device for changing a PANID may be determined in consideration of the number of nodes, a remaining battery capacity, and the like.

When the coordinator 1 300 is determined as a coordinator for changing the PANID thereof through the negotiation, the coordinator 1 300 may change the PANID thereof (S1760). Here, the PANID may be changed through the hash algorithm described above with reference to FIG. 6.

After changing the PANID, the coordinator 1 300 floods a message including the changed PANID in order to transmit the changed PANID to every node of the corresponding PAN through a beacon and to inform the entire network about the changed PANID (S1770). In this case, the message may include the parameters such as illustrated in Table 4.

Through the method described above with reference to FIGS. 15 through 17, when a PANID conflict occurs between the source coordinator and the forwarder coordinator that forwards a packet inbetween, the PANID may be changed to resolve the conflict and a delay time between the nodes may be reduced. Also, when the PANID is changed, a unique PANID may be created by using the hash algorithm described above with reference to FIG. 6.

Figure 18:
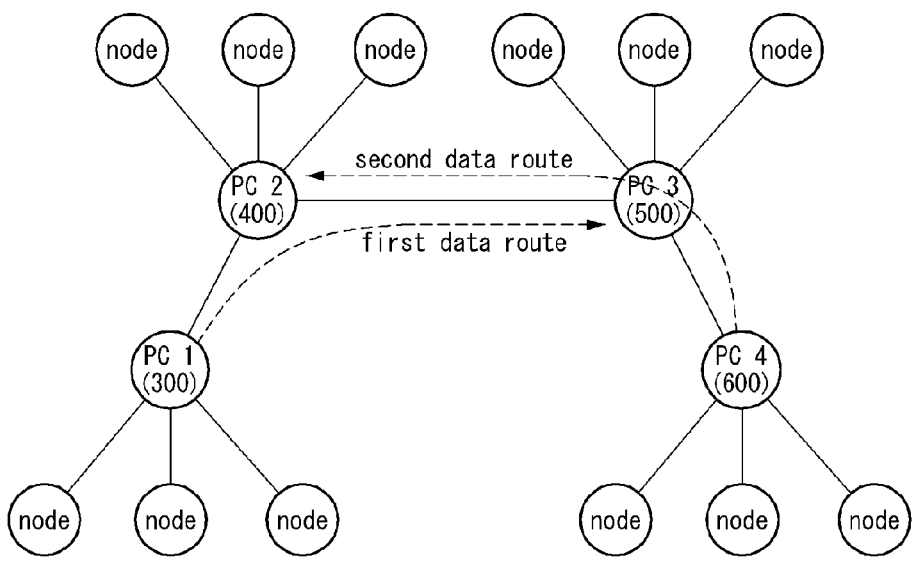
FIGS. 18 through 20 are views illustrating an example in which when a coordinator forwarding data in a network of a wireless communication system discovers a PANID conflict among other coordinates, the forwarder coordinator resolves the PANID conflict.
Figure 19:
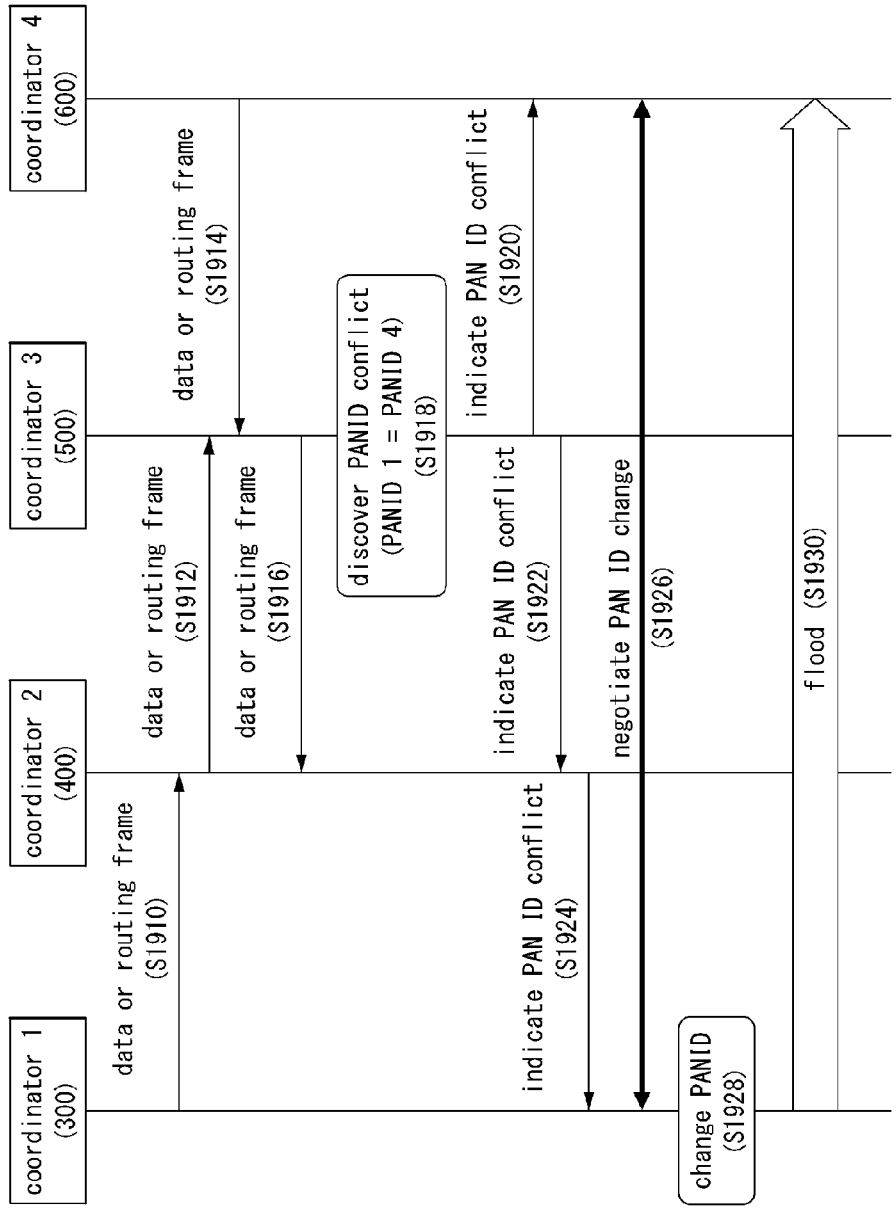
Figure 20:
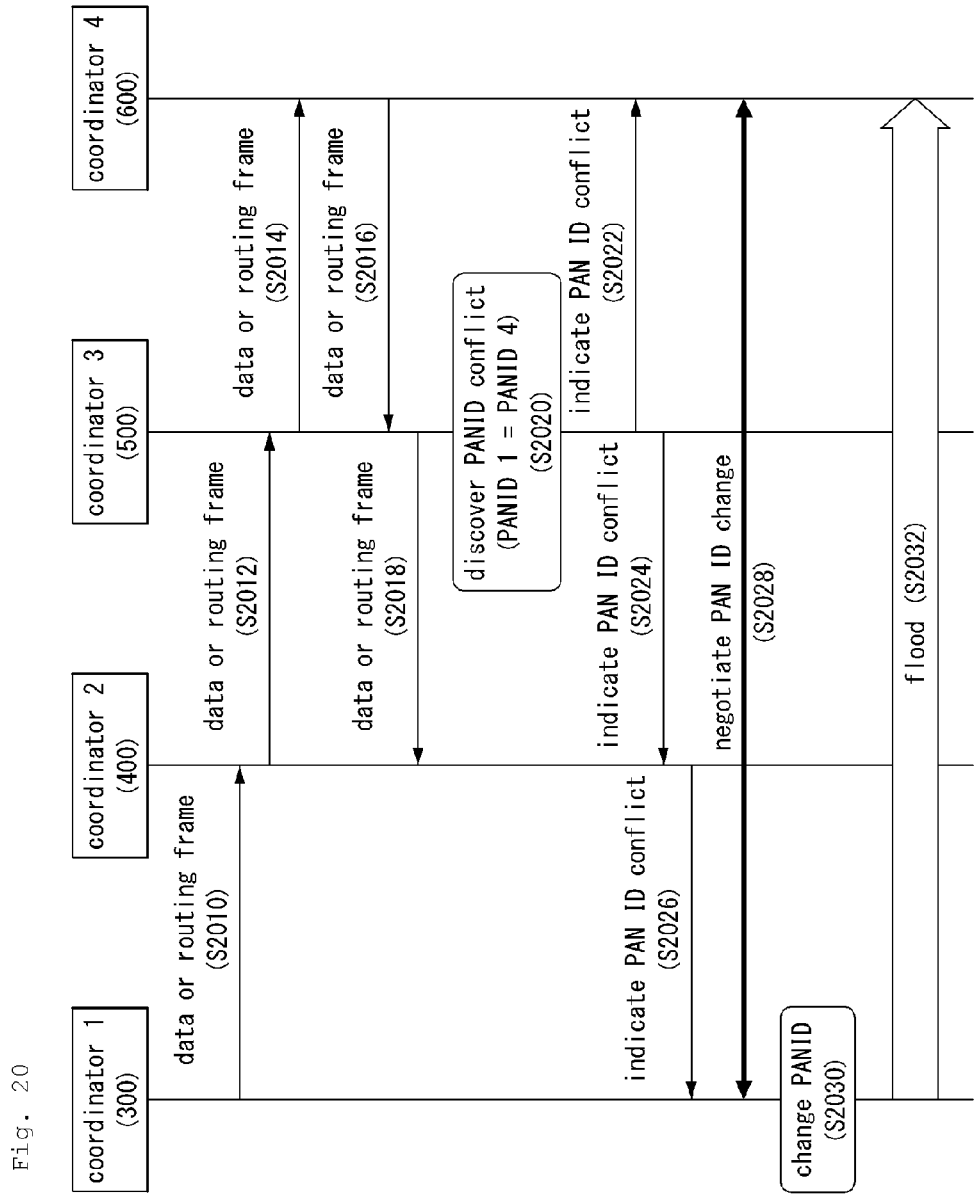

FIGS. 18 through 20 are views illustrating an example in which when a coordinator forwarding data in a network of a wireless communication system discovers a PANID conflict among other coordinates, the forwarder coordinator resolves the PANID conflict.

Referring to FIG. 18, a coordinator may discover a PANID conflict of two different source coordinators and may change a PANID through a negotiation between the two different source coordinators.

The coordinator 1 300, a source coordinator, may transmit data or a routing frame to the coordinator 3 500 through the coordinator 2 400 along a first data route.

Also, a coordinator 4 600, another source coordinator, may transmit data or a routing frame to the coordinator 2 400 through the coordinator 3 500 along a second data route.

Here, the coordinator 3 500 may check whether a PANID of the coordinator 1 300 and a PANID of the coordinator 4 600 conflict.

As for a specific flow with reference to FIG. 19, the coordinator 1 300 forwards data or a routing frame to the coordinator 3 500 as a destination through the coordinator 2 400 in an add-hoc manner (S1910 and S1912).

Thereafter, the coordinator 4 600 forwards data or a routing frame to the coordinator 2 400 as a destination though the coordinator 3 500 in an add-hoc manner (S1914 and S1916).

Here, the coordinator 3 500 may check whether a PANID 1 of the coordinator 1 300 and a PANID 4 of the coordinator 4 600 are the same, by playing the role of a destination of the coordinator 1 300 and the role of a forwarder of the coordinator 4 600

In this case, when the PANID 1 of the coordinator 1 300 and the PANID 4 of the coordinator 4 600 are the same, the coordinator 30 500 may discover that the PANIDs conflict (S1918) and forward an indication message indicating the PANID conflict to the coordinator 1 300 and the coordinator 4 600 in an ad-hoc manner (S1920, S1922, and S1924).

The indication message may include parameters of Table 5 below.

TABLE 5

| Name | Type | Valid range | Value |
| --- | --- | --- | --- |
| Status | Status | 0x00-0x11 | 0x11 (multiple PANID conflict) |
| Network address | Integer | 0x000-0xfff7 | Conflicted PANID |

Upon recognizing the occurrence of the PANID conflict through the indication message, the coordinator 1 300 and the coordinator 4 600 negotiate with each other as to whether who (which of them) will change the PANID (S1926).

Through the negotiation, a device for changing a PANID may be determined in consideration of the number of nodes, a remaining battery capacity, and the like.

When the coordinator 1 300 is determined as a coordinator for changing the PANID thereof through the negotiation, the coordinator 1 300 may change the PANID thereof (S1928). Here, the PANID may be changed through the hash algorithm described above with reference to FIG. 6.

After changing the PANID, the coordinator 1 300 floods a message including the changed PANID in order to transmit the changed PANID to every node of the corresponding PAN through a beacon and to inform the entire network about the changed PANID (S1930). In this case, the message may include the parameters such as illustrated in Table 4.

The PANID conflict described in this embodiment may also occur among three or more coordinators, and two or more coordinators may discover the PANID conflict. For example, in the present embodiment, in addition to the coordinator 1 300 and the coordinator 4 600, if another source coordinator is further present, a PANID of the source coordinator may also be the same. Also, the coordinator 2 400, as well as the coordinator 3 400, may also discover a PANID conflict between source coordinators, and a procedure thereof is the same as the procedure described above with reference to FIG. 19.

Referring to FIG. 20, unlike the example of FIG. 19, even in a case in which the coordinator 3 50 is not a source coordinator or a destination coordinator, the coordinator 3 500 may discover a PANID conflict of other source coordinators.

The coordinator 1 300 forwards data or a routing frame to the coordinator 4 600 as a destination through the coordinator 2 400 in an ad-hoc manner (S2010, S2012, and S2014).

Steps S2016 to S2032 of FIG. 20 are the same as steps S1914 to S1930 of FIG. 19, and thus, a description thereof will be omitted.

The example of FIG. 20 shows that, even when the coordinator operates simply as a forwarder coordinator, it may check forwarded data or routing frame to discover a PANID conflict between other source coordinators.

Figure 21:
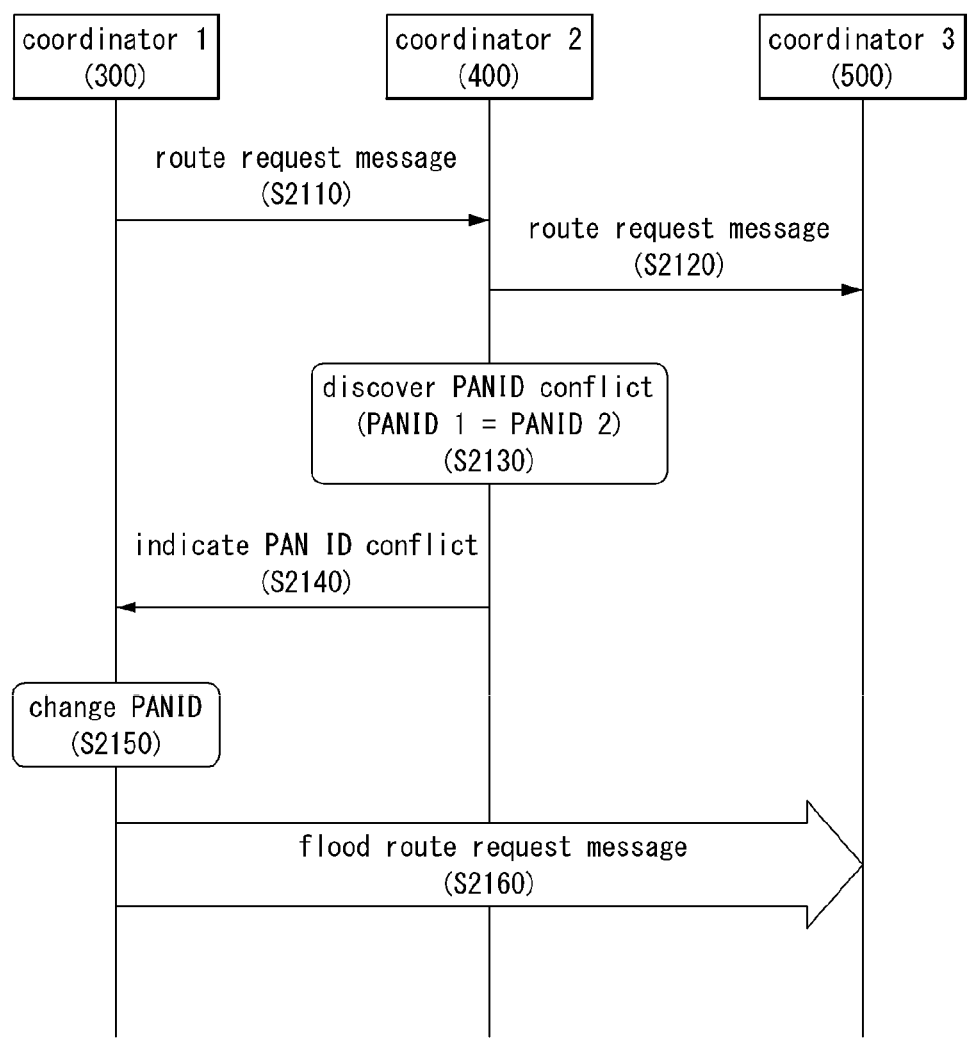
FIG. 21 is a flow chart illustrating an example of resolving a PANID conflict when a reactive routing scheme is used, to which the present invention is applied.

FIG. 21 is a flow chart illustrating an example of resolving a PANID conflict when a reactive routing scheme is used, to which the present invention is applied.

Referring to FIG. 21, when a source coordinator forwards data and a certain coordinator on a data route discovers that a PANID thereof is the same as a PANID of the source coordinator, the certain coordinator informs the source coordinator about occurrence of the PANID conflict.

In detail, the reactive routing scheme is a method of searching for a route at a time when traffic occurs, that is, at a time when a data transmission occurs, which reduces overhead of a proactive routing scheme. Route information is stored in each node of the route, and when the corresponding route is not used for a predetermined period of time, the route information is deleted from each node.

According to an ad-hoc on-demand distance vector (AODV) algorithm, a typical algorithm of the reactive routing scheme, all the devices do not perform a periodic routing discovery procedure, and only when a data transfer occurs, a route request message is flooded to the entire network in order to search for a route in an on-demand form, and an optimal route is searched on the basis of a response thereof.

Referring to the AODV routing, when data transfer occurs in the coordinator 1 300 as a source coordinator, the coordinator 1 300 floods a route request message (S2110 and S2120).

Here, the coordinator 2 400 may compare a PANID 2 as a PANID thereof with a PANID1 as a PANID of the first coordinator 1 300, and when the PANID 1 and the PANID are the same, the coordinator 2 400 may discover a PANID conflict (S2130).

Upon discovering the PANID conflict, the coordinator 400 may inform the coordinator 1 300 about the PANID conflict through an indication message (S2140).

The indication message may be transmitted in an ad-hoc manner, like the data or routing frame. The indication message may include the parameters of Table 3.

Upon receiving that the PANID of the coordinator 1 300 and the PANID of the coordinator 2 400 conflict through the indication message, the coordinator 1 300 changes the PANID thereof through the hash algorithm of FIG. 6 (S2150) and transmits the changed PANID to every node of the corresponding PAN through a beacon.

In order to inform the entire network about the changed PANID, the coordinator 1 300 may flood a message including the changed PANID (S2160), and in this case, the message may include parameters as illustrated in Table 4 above.

After the change of the PANID, the coordinator 1 300 floods the route request message again, so that when an additional PANID conflict occurs, the coordinator 1 300 may repeatedly perform the aforementioned-operation to resolve the PANID conflict.

The foregoing embodiment may be applied to any reactive routing type algorithm, as well as to the AODV algorithm.

Figure 22:
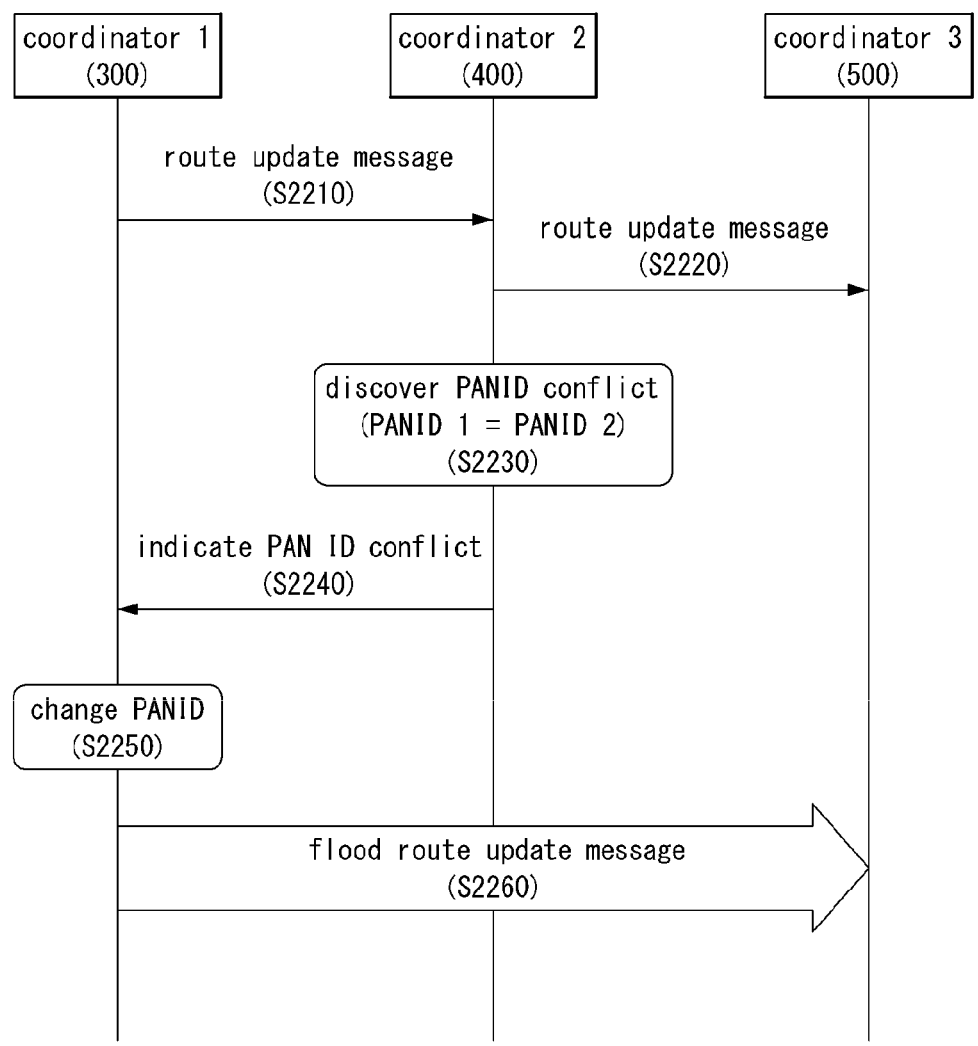
FIG. 22 is a flow chart illustrating an example for resolving a PANID conflict when proactive routing is performed, to which the present invention is applied.

FIG. 22 is a flow chart illustrating an example for resolving a PANID conflict when proactive routing is performed, to which the present invention is applied.

Referring to FIG. 22, when a certain coordinator discovers that a PANID thereof is the same as that of a source coordinator through a periodic message transmitted from the source coordinator, the certain coordinator informs the source coordinator about the PANID conflict.

In detail, in the proactive routing scheme, every mobile nodes maintains the latest route information all the time and propagates routing information to the entire network periodically or whenever a network topology is changed so that each node may change routing information thereof.

For example, according to a destination sequenced distance vector (DSDV) routing scheme, a typical algorithm of the proactive routing scheme, every device periodically floods a route update message, searches for an optimal route on the basis of a response thereto, and stores the searched optimal route in real time.

In order to perform periodical route discovery, the coordinator 1 300 floods a route update message (S2210 and S2220).

Here, the coordinator 2 400 may compare a PANID 1 as a PANID of the coordinator 1 300 and a PANID 2 as a PANID thereof, and when the PANID 1 and the PANID 2 are the same, the coordinator 2 400 may discover a PANID conflict (S2230).

Upon discovering the PANID conflict, the coordinator 400 may inform the coordinator 1 300 about the PANID conflict through an indication message (S2240).

The indication message may be transmitted in an ad-hoc manner, like the data or routing frame. The indication message may include the parameters of Table 3.

Upon receiving that the PANID of the coordinator 1 300 and the PANID of the coordinator 2 400 conflict through the indication message, the coordinator 1 300 changes the PANID thereof through the hash algorithm of FIG. 6 (S2250) and transmits the changed PANID to every node of the corresponding PAN through a beacon.

In order to inform the entire network about the changed PANID, the coordinator 1 300 may flood a message including the changed PANID (S2260), and in this case, the message may include parameters as illustrated in Table 4 above.

After the change of the PANID, the coordinator 1 300 floods the route update message again, so that when an additional PANID conflict occurs, the coordinator 1 300 may repeatedly perform the aforementioned-operation to resolve the PANID conflict.

The foregoing embodiment may be applied to any proactive routing type algorithm, as well as to the DSDV algorithm.

Through FIGS. 21 and 22, when a PANID conflict occurs, the PANID conflict according to a routing scheme may be resolved, and since the PANID conflict is avoided by creating a unique PANID, a delay time between nodes may be reduced.

The method and apparatus proposed in the present invention described above through the drawings may be applied to a ZigBee system, or the like.

The embodiments described above may be variously modified and changed by those skilled in the art to which the present invention pertains without departing from the scope of the technical concept of the present invention, and thus are not limited to the aforementioned embodiments and accompanying drawings.

INDUSTRIAL APPLICABILITY

This disclosure provides a method and apparatus for effectively changing a PANID in a network of a wireless communication system.

The invention claimed is:

1. A method for creating, by a coordinator including a processor and a radio frequency (RF) unit, a personal area network (PAN) identifier (ID) of a network in a wireless communication system, the method comprising: generating, by the processor, a first PAN ID; receiving, by the RF unit, a message including a second PAN ID from a source coordinator; comparing, by the processor, the first PAN ID with the second PAN ID; transmitting, by the RF unit, a first indication message related to a PAN ID conflict to the source coordinator, when the first PAN ID and the second PAN ID are the same; determining, by the processor, whether the first PAN ID is changed based on one or more parameters; and changing the first PAN ID according to a result of the determining; and transmitting, by the RF unit, a second indication message including the changed first PAN ID and status information indicating a change in the first PAN ID to a plurality of coordinators,
wherein the first PAN ID is changed through a hash algorithm, and wherein the first indication message includes a conflicted PAN ID and an error code indicating a conflict.

2. The method of claim 1, wherein the hash algorithm uses a 48-bit address of the coordinator and a 16-bit hash table.

3. The method of claim 1, wherein the one or more parameters include at least one of a number of nodes of a PAN and a remaining battery capacity.

4. The method of claim 1, wherein the message is transmitted from the source coordinator in an ad-hoc manner.

5. The method of claim 1, wherein the message is transmitted from the source coordinator to discover a route for routing, when data is generated by the source coordinator.

6. A method for creating, by a coordinator including a processor and a radio frequency (RF) unit, a personal area network (PAN) identifier (ID) of a network in a wireless communication system, the method comprising: receiving, by the RF unit, a first message including a first PAN ID from a first source coordinator: receiving, by the RF unit, a second message including a second PAN ID from a second source coordinator; comparing, by the processor, the first PAN ID and the second PAN ID; when the first PAN ID and the second PAN ID are the same, transmitting, by the RF unit, a first indication message related to a PAN ID conflict to the first source coordinator and the second source coordinator: and receiving, by the RF unit, a second indication message including a third PAN ID and status information indicating a change in the first PAN ID or the second PAN ID from a plurality of coordinators, wherein the third PAN ID is generated through a hash algorithm,
and wherein the first indication message includes a conflicted PAN ID and an error code indicating a conflict.

7. The method of claim 6, wherein the hash algorithm uses a 48-bit address and a 16-bit hash table.

8. The method of claim 6, wherein the first message is transmitted from the first source coordinator and the second message is transmitted from the second source coordinator in an ad-hoc manner.

9. A coordinator creating a personal area network (PAN) identifier (ID) of a network in a wireless communication system, the coordinator comprising:
a radio frequency (RF) communication unit; and
a controller functionally connected to the RF communication unit,
wherein the controller is configured to:
generate a first PAN ID,
control the RF communication unit to receive a message including a second PAN ID from a source coordinator,
compare the first PAN ID with the second PAN ID,
when the first PAN ID is the same as the second PAN ID, transmit a first indication message related to a PAN ID conflict to the source coordinator,
determine whether the first PAN ID is changed based on one or more parameters,
change the first PAN ID according to a result of the determining, and
control the RF communication unit to transmit a second indication message including the changed first PAN ID and status information indicating a change in the first PAN ID to a plurality of coordinators,
wherein the first PAN ID is changed through a hash algorithm, and
wherein the first indication message includes a conflicted PAN ID and an error code indicating a conflict.

10. The coordinator of claim 9, wherein the hash algorithm uses a 48-bit address of the coordinator and a 16-bit hash table.

11. The coordinator of claim 10, wherein the one or more parameters include at least one of a number of nodes of a PAN and a remaining battery capacity.

12. The coordinator of claim 9, wherein the message is transmitted from the source coordinator in an ad-hoc manner.

* * * * *